United States Patent
Fullerton et al.

(10) Patent No.: US 7,602,339 B2
(45) Date of Patent: *Oct. 13, 2009

(54) METHOD AND SYSTEM FOR EXTENSIBLE POSITION LOCATION

(75) Inventors: Larry W. Fullerton, Owens Crossroads, AL (US); Mark D. Roberts, Huntsville, AL (US); W. Michael Einhorn, II, Madison, AL (US); Kelly Loum, Athens, AL (US); Irina Dodoukh, Huntsville, AL (US); S. Scott O'Hanian, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/822,239

(22) Filed: Jul. 3, 2007

(65) Prior Publication Data

US 2008/0158062 A1    Jul. 3, 2008

Related U.S. Application Data

(63) Continuation of application No. 11/103,438, filed on Apr. 12, 2005, now Pat. No. 7,239,277.

(60) Provisional application No. 60/561,154, filed on Apr. 12, 2004.

(51) Int. Cl.
*G01S 3/02* (2006.01)

(52) U.S. Cl. .................. 342/463; 342/458; 342/465

(58) Field of Classification Search .............. 342/458, 342/463–465; 455/456.1
See application file for complete search history.

(56) References Cited

U.S. PATENT DOCUMENTS

| | | | |
|---|---|---|---|
| 3,662,316 A | 5/1972 | Robbins |
| 4,641,317 A | 2/1987 | Fullerton |
| 4,813,057 A | 3/1989 | Fullerton |
| 4,979,186 A | 12/1990 | Fullerton |
| 5,363,108 A | 11/1994 | Fullerton |
| 5,748,891 A | 5/1998 | Fleming et al. |
| 6,026,125 A | 2/2000 | Larrick, Jr. et al. |
| 6,054,950 A | 4/2000 | Fontana |
| 6,111,536 A | 8/2000 | Richards et al. |

(Continued)

OTHER PUBLICATIONS

A. Savvides et al., Dynamic Fine-Grained Localization in Ad-Hoc Networks of Sensors, Proc. 7th Ann. Intl. Conf. on Mobile Computing and Networking (ACM MobiCom), p. 166-179, Jul. 2001.*

(Continued)

*Primary Examiner*—Fred H. Mull
(74) *Attorney, Agent, or Firm*—Venable LLP; Robert S. Babayi

(57) ABSTRACT

A method and system for extensible positioning that uses a primary reference node at a known first position and a secondary reference node at a second position, where a range is measured between the secondary reference node and the primary reference node. The second position is determined based upon the first position and the measured range. A second range is measured between the secondary reference node and a non-fixed node. A third position corresponding to the non-fixed node is determined based upon the second position and the second range.

20 Claims, 32 Drawing Sheets

U.S. PATENT DOCUMENTS

| | | | |
|---|---|---|---|
| 6,133,876 | A | 10/2000 | Fullerton et al. |
| 6,177,903 | B1 | 1/2001 | Fullerton et al. |
| 6,218,979 | B1 | 4/2001 | Barnes et al. |
| 6,275,707 | B1 | 8/2001 | Reed et al. |
| 6,300,903 | B1 | 10/2001 | Richards et al. |
| 6,603,818 | B1 | 8/2003 | Dress, Jr. et al. |
| 6,614,384 | B2 | 9/2003 | Hall et al. |
| 6,690,741 | B1 | 2/2004 | Larrick, Jr. et al. |
| 6,700,538 | B1 | 3/2004 | Richards |
| 6,700,939 | B1 | 3/2004 | McCorkle et al. |
| 6,760,387 | B2 | 7/2004 | Langford et al. |
| 6,810,087 | B2 | 10/2004 | Hoctor et al. |
| 7,239,277 | B2 * | 7/2007 | Fullerton et al. ............ 342/458 |
| 2003/0054838 | A1 * | 3/2003 | Carrez ..................... 455/456.1 |
| 2004/0203380 | A1 * | 10/2004 | Hamdi et al. ............ 455/456.1 |
| 2005/0070304 | A1 * | 3/2005 | Farchmin et al. ......... 455/456.1 |

OTHER PUBLICATIONS

A. Savvides et al., The Bits anf Flops of the N-hop Multilateration Primitive For Node Localization Problems, Proceedinsg of the First ACM International Workshop on Sensor Networks and Applications, p. 112-121, Sep. 2002.*

J. Foerster, Ultra-wideband Technology for Short-Range, High-Rate Wireless Communications, Intel Technology Journal , 2001.*

K.K. Chintalapudi et al., Ad-hoc localization using ranging and sectoring, Twenty-third Annual Joint Conference of the IEEE Computer and Communications Societies, vol. 4, p. 2662-2672, Mar. 2004.*

M. Barbeau et al., Improving Distance Based Geographic Location Techniques in Sensor Networks, 3rd International Conference on AD-HOC Networks & Wireless, Jul. 2004.*

D. Carter et al., Automated geolocation network for use in GPS-degraded environments, Position Location and Navigation Symposium p. 690-697, Apr. 2004.*

N. Cravotta, Ultrawideband: the next wireless panacea? EDN, vol. 47, No. 23, p. 51-58, Oct. 2002.*

F.L. Lewis, Wireless Sensor Networks. Smart Environments: Technologies, Protocols, and Applications, John Wiley, New York, 2004.*

* cited by examiner

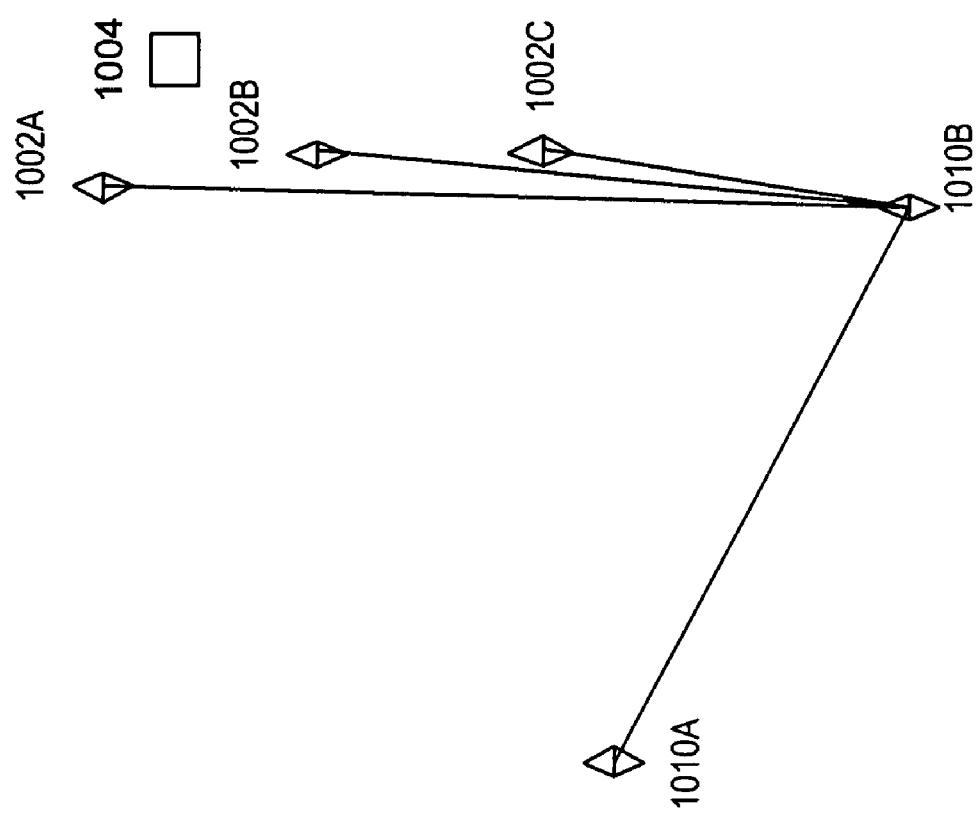

METHOD AND SYSTEM FOR EXTENSIBLE POSITION LOCATION

CROSS-REFERENCE TO RELATED APPLICATIONS

This application is a continuation of application Ser. No. 11/103,438 filed on Apr. 12, 2005, now U.S. Pat. No. 7,239,277 B1, which claims the benefit of U.S. Provisional Application Ser. No. 60/561,154, filed Apr. 12, 2004.

GOVERNMENT RIGHTS

The US Government has a paid-up license in this invention and the right in limited circumstances to require the patent owner to license others on reasonable terms as provided for by the terms of contract DDAB07-03-D-C213-0003 awarded by the United States Army Communications and Electronics Command, Fort Monmouth, N.J. 07703.

FIELD OF THE INVENTION

The present invention relates to positioning systems, and more particularly to ranging between two or more nodes having known positions and a fixed or non-fixed node to determine its position.

BACKGROUND OF THE INVENTION

Ultra wideband (UWB) positioning architectures are known to typically involve two or more reference radios used to determine the position of a target radio. Conventional UWB positioning architectures determine the position of the target radio relative to the position of the reference radios. In these conventional architectures, each of the reference radios are generally placed at unique fixed locations and communicate signals with the target radio to determine the position of the target radio relative to the reference radios. Typically, the location of each of the fixed reference radios is determined by some independent method, such as global positioning system (GPS), local survey, or other known positioning or mapping systems. When determining the position of the target radio, UWB signals are communicated between the target radio and the reference radios. The distance between a given reference radio and the target radio can be determined from the time-of-flight of a UWB signal as the UWB signal travels between the reference radio and the target radio, where the time-of-flight can be measured directly or determined using various well known angle-of-arrival and/or differential time-of-arrival techniques.

However, known UWB systems suffer from various problems. Conventional systems do not allow for a quick addition of a new reference node to the positioning system. Typically, when a reference radio is placed in a UWB positioning system, the location of the reference node must be determined by a time-consuming independent method, such as GPS, prior to using the reference radio as a reference point. This may cause problems where setting up a positioning system is time critical, such as in firefighting or warfare. Additionally, conventional methods of determining the position of a non-fixed radio have insufficient accuracy and may have difficulty in resolving the position of a reference radio, particularly in situations when the radio is moving or which a GPS signal is blocked such as indoors. Moreover, traditional positioning architectures neither readily accept UWB radios nor incorporate their capabilities.

Additional problems in conventional UWB systems are caused by multipath characteristics of UWB signals. Multipath characteristics of a UWB signal impacts the accuracy of a time-of-flight distance measurement. Conventional time-of-flight distance measurements assume that the amplitude of a transmitted signal is received across a direct path between a transmitter and a receiver, and that the transmitted signal that follows the direct path is larger than received signals that follow an indirect path. Time-of-flight distance measurements also assume that the leading edge of the received signal corresponds to the direct path between a transmitter and a receiver. However, these assumptions are not always correct. Oftentimes, multipath signals may combine with one another such that the direct path portion of the signal has a lesser amplitude than combined multipath signals. Also, a direct path between two radios may not exist; in which case a time measurement based on a determined leading edge of a signal will not correspond to the direct path. In such a situation, a leading edge detection approach that assumes the leading edge corresponds to the location in the signal having the maximum amplitude may incorrectly determine the location of the leading edge. Incorrect determination of the leading edge results in error in the timing measurement, which translates into an incorrectly determined distance between the reference radio and the target radio that, when combined with other distance measurements between the target radio and other reference radios, further translates into an incorrectly determined position of the target radio.

What is needed, therefore, is an extensible positioning architecture that may quickly add additional radios to determine a position of a fixed or non-fixed radio with an acceptable accuracy.

BRIEF SUMMARY OF THE INVENTION

According to the present invention, there is provided an extensible positioning system. In embodiments, the system may include sets of primary reference nodes, secondary reference nodes, and non-fixed nodes. Ranging is performed between the primary and reference nodes to determine the positions of the secondary reference nodes. The secondary reference nodes thereby extend the ability of the system to perform ranging with non-fixed nodes.

In one exemplary embodiment of a method for positioning a node according to the invention, a first node is placed at a known first position. A range is then measured between the first node and a second node and the position of the second node is determined based upon the first position and the range. A position of a third node is then determined from the position of the second node. Either or both the second node and the third node can be a secondary reference or a non-fixed node.

In another exemplary embodiment, at least one range measurement quality metric is associated with at least one range measurement where a range quality measurement can be a standard deviation, a measurement age metric, an error region metric, a signal quality metric, an RF environment metric, or a ranging geometry metric. An error region metric may be the number of error region levels or an error region elongation metric. A signal quality measurement may be a bit error rate or a signal-to-noise ratio. The RF environment metric can be used to select a RF signal propagation model used to calculate a range. A ranging geometry metric can be an angle acuteness metric or a geometric dilution of precision metric.

In a further exemplary embodiment of the invention, at least one range measurement quality metric is used to determine a confidence level of a position determined for a node. In one embodiment of the invention, the confidence level is compared to at least one other confidence level determined for at least one other position determined for the node to select the most acceptable determined position of the node.

In one embodiment, the third node determines its own position. In an alternative embodiment, the position of the third node is determined by another node such as a base station. In one embodiment, ranging information is filtered prior to determining a position to remove ranging noise.

In a preferred embodiment, the first node, the second node, and the third node include an Ultra Wideband radio.

In another exemplary embodiment of the invention, a position location system includes a first node having a known first position, a second node having a second position determined based upon a range measured between the second node and the first node, and a third node having a third position determined based upon said second position. Either or both the second node and the third node can be a secondary reference or a non-fixed node.

In one embodiment, the position location system associates at least one range measurement quality metric with at least one range measurement.

In a further exemplary embodiment of the invention, the position location system uses at least one range measurement quality metric to determine a confidence level of a position determined for a node. In one embodiment of the invention, the confidence level is compared to at least one other confidence level determined for at least one other position determined for the node to select the most acceptable determined position of the node.

In a preferred embodiment, the first node, the second node, and the third node include an Ultra Wideband radio.

These and additional features and advantages of the present invention will become more apparent from the detailed description set forth below when taken in conjunction with the drawings in which like reference characters generally identify corresponding elements throughout.

BRIEF DESCRIPTION OF THE DRAWINGS

The accompanying drawings, which are incorporated herein and form part of the specification, illustrate embodiments of the present invention and, together with the description, further serve to explain the principles of embodiments of the invention.

FIG. 10C illustrates an exemplary node in near alignment with reference nodes.

Figure 1:
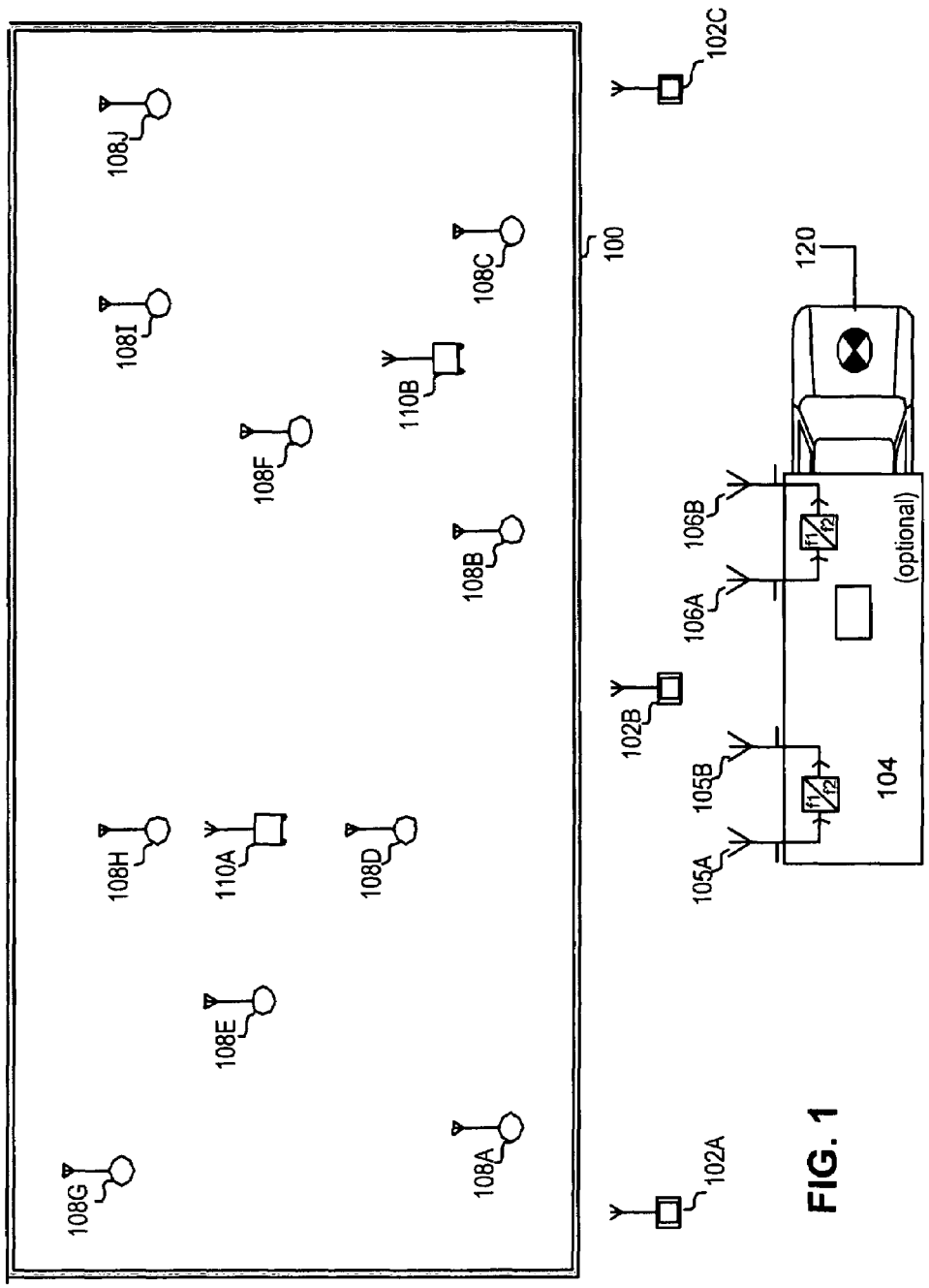
FIG. 1 illustrates an exemplary embodiment of a Position Location System (PLS) in accordance with the invention.

It should be understood that these figures depict embodiments of the invention. Variations of these embodiments will be apparent to persons skilled in the relevant art(s) based on the teachings contained herein. For example, the flow charts contained in these figures depict particular operational flows. However, the functions and steps contained in these flow charts can be performed in other sequences, as will be apparent to persons skilled in the relevant art(s) based on the teachings contained herein.

DETAILED DESCRIPTION OF THE INVENTION

The invention is a novel position location system in a defined or ad-hoc wireless network distributed in and around a coverage area such as inside a structure. In the following description, numerous specific details are set forth in order to provide a thorough understanding of the present invention. In other instances, well known communication techniques have not been described in particular detail to avoid unnecessarily obscuring the invention. As herein defined, communications means transmission or reception of a signal with or without modulated information.

The present invention implements UWB radio communications technologies in a positioning architecture to improve the accuracy over known positioning systems and to further resolve positioning problems that are otherwise irresolvable, such as, but not limited to, providing a system for extensible positioning of non-fixed UWB radios (nodes).

An UWB radio provides a platform for solutions and improvements to conventional positioning systems. Briefly, basic UWB radio transmitters typically emit short pulses with tightly controlled average pulse-to-pulse intervals where the pulse may involve one or many cycles. In the widest bandwidth embodiments, UWB radios transmit a monocycle pulse resembling the first derivative of a Gaussian pulse. Narrower bandwidth embodiments of UWB radio transmitters may instead emit bursts of cycles, where the burst of cycles may be shaped in accordance with a desired envelope. Various types of UWB waveforms and methods of waveform shaping are described in U.S. Pat. No. 6,026,125 (issued Feb. 15, 2000) to Larrick, Jr. et al, which is incorporated herein by reference in its entirety.

One type of UWB radio is referred to as an impulse radio. Impulse radios were first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994), all to Larry W. Fullerton. These patent documents are incorporated herein by reference in their entireties.

The earliest impulse radio systems typically used pulse position modulation. Pulse position modulation is a form of time modulation in which the value of each instantaneous sample of a modulating signal is caused to modulate the position in time of a pulse. For impulse radio communications, the pulse-to-pulse interval is varied on a pulse-by-pulse basis by two components: an information component and a pseudo-random code component. The pseudo-random component is similar to those in spread spectrum systems. Typically, spread spectrum systems make use of pseudo-random codes to spread the normally narrowband information signal over a relatively wide band of frequencies. A spread spectrum receiver correlates these signals to retrieve the original information signal. However, unlike spread spectrum systems, the pseudo-random code for impulse radio communications is not necessary for energy spreading because the monocycle pulses themselves have an inherently wide information bandwidth. Instead, the pseudo-random code in impulse radio communications is used for channelization, for energy smoothing in the frequency domain, and for jamming resistance.

UWB radio systems such as impulse radio systems can vary pulse characteristics other than time position for modulation purposes. M-ary versions of phase modulation, frequency modulation, amplitude modulation, alone and in combination with pulse position modulation have been proposed and implemented as described in U.S. Pat. No. 5,748,891 (issued May 5, 1998) to Fleming et al., U.S. Pat. No. 6,133,876 (issued Oct. 17, 2000) to Fullerton et al., and U.S. Pat. No. 6,700,939 (issued Mar. 2, 2004) to McCorkle et al. These patent documents are incorporated herein by reference in their entireties.

UWB radio systems such as impulse radio systems can also vary pulse characteristics other than time position for channelization purposes. U.S. Pat. No. 6,700,939 (issued Mar. 2, 2004) to McCorkle et al. describes use of combinations of inverted and non-inverted pulses to define user channels. U.S. Pat. No. 6,603,818 (issued Aug. 5, 2003) to Dress, Jr. et al. describes use of combinations of different pulse widths to define user channels and use of orthogonal pulse types to define multiple data channels within user channels. U.S. patent application Ser. No. 09/638,192 by Roberts et al. discloses varying pulse amplitude and pulse type to define user channels. These patent documents are incorporated herein by reference in their entireties.

The UWB radio receiver can be a direct conversion receiver with a cross correlator front end. The cross correlator front end coherently converts an electromagnetic train of pulses to a baseband signal in a single stage. The baseband signal is the basic information channel for the basic UWB radio communications system, and is also referred to as the information bandwidth. The data rate of the UWB radio transmission is only a fraction of the periodic timing signal used as a time base. Each data bit modulates many pulses of the periodic timing signal yielding a train of pulses for each data bit. The cross correlator of the impulse radio receiver integrates the train of pulses to recover the transmitted data bit. Two forms of homodyne impulse radio receivers are known in the art including the impulse radios of Fullerton et al., previously incorporated by reference, which involve correlation of received signals with template signals generated by the receiver, and a transmitted reference impulse radio where the impulse radio transmitter transmits pulses in pairs spaced apart in time by a known time delay(s) where the receiver coherently correlates a delayed received signal with the received signal. A transmit reference impulse radio is described in U.S. Pat. No. 6,810,087 (issued Oct. 26, 2004) to Hoctor et al, which is incorporated herein by reference.

The UWB radio receiver can alternatively be a threshold detector type system where pulses having amplitude greater than the detection threshold of a detector diode are transmitted and received. Examples of threshold detector type impulse radio systems are described in U.S. Pat. Nos. 3,662,316 (issued May 9, 1972) to Robbins and U.S. Pat. No. 6,690,741 (issued Feb. 10, 2004) to Larrick et al, both of which are incorporated herein by reference.

The present invention implements a Position Location System (PLS) using UWB radio transceivers that both transmit and receive UWB signals. The use of transceivers in the PLS described herein is not intended to limit the scope of the invention, which can be practiced using various combinations of transmit-only, receive-only, and transceiver devices. The PLS is a user deployable system that provides easily interpreted, real-time, highly accurate range matrix information to both a user within a building and incident command personnel remote to the building. The invention may be used within and around man-made buildings, such as houses or office structures, but is not limited to these areas. The present invention may also be used in other natural structures and open areas so long as signals may be communicated between UWB radios. The following section gives a general overview of the invention.

FIG. 1 illustrates an exemplary embodiment of a position location system (PLS) according to the present invention. A vehicle 120 may be used to transport and place a base station 104 alongside a building 100. The base station 104 includes direction finding antenna arrays 105A-B and 106A-B that are positioned facing the building 100. In between the base station 104 and building 100, are primary reference nodes 102A-102C. In a preferred embodiment, the primary reference nodes 102A-102C are placed at fixed, known locations that are unique from one another and the base station 104. In this embodiment, a primary reference node includes an UWB radio placed at a fixed position. Each of the UWB radios of the primary reference nodes 102A-102C has an antenna for communicating UWB signals with the base station 104. The UWB signals are communicated to determine the location of the base station 104 relative to the primary reference nodes 102A-102, as will be discussed later in detail. Typically, the primary reference nodes 102A-102C are placed by a person, but may be placed by a non-fixed remote control device (e.g., a robot).

In accordance with the invention, secondary reference nodes 108A-108J are positioned at fixed yet typically arbitrarily selected unknown locations, which may be inside or outside building 100. Each secondary reference node 108A-108J includes an UWB radio having an antenna for communicating with each other, the primary reference nodes 102A-102C, and the base station 104. The secondary reference nodes 108A-108J range with one another and the primary reference nodes 102A-102C to develop positioning data for constructing a node map, as will be discussed later in detail. Like a primary reference node, a secondary reference node's position is fixed and can be used to determine the position of another node. However, whereas a primary reference node has a known location (position), a secondary reference node has a location determined by a ranging process. As such, a location determined using primary references is more accurate than one determined using one or more secondary references due to ranging errors, as further described below.

Also shown within the building 100 are non-fixed nodes 110A-110B. The non-fixed devices 110A-110B may move within and outside of the building 100 and each include an UWB radio. At any given time, the non-fixed nodes 110A-110B may be moving or stationary. Each non-fixed node 110A-110B may include a handheld display for a user, and may also include the functionality of a personal digital assistant (PDA). In one embodiment, the non-fixed nodes 110A-110B are personal tracking units that are transported by a person and incorporated into, for example, a handheld unit, a helmet unit, or a backpack unit. In an alternative embodiment, the non-fixed devices 110A-110B are associated with or incorporated into a movable remote controlled platform (e.g., a robot) that includes a video camera that allows a remote user to direct the non-fixed device. As is the case with a secondary reference node, the position of a non-fixed node is determined by a ranging process. The non-fixed node is normally not used as a reference node since it may be moving. However, exceptions are described herein where a non-fixed node may be used as a secondary reference node due to certain circumstances.

Figure 2:
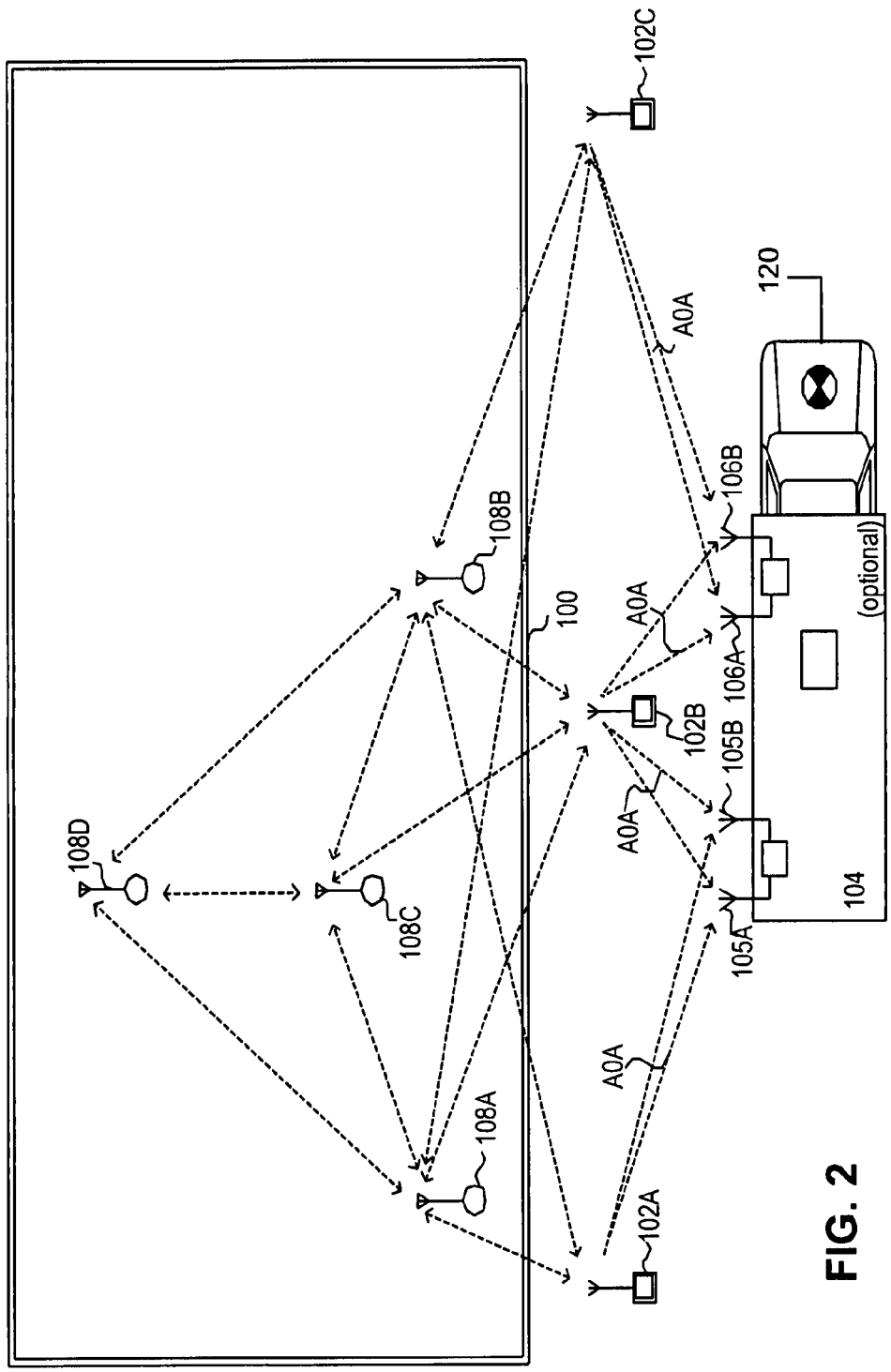
FIG. 2 illustrates an exemplary embodiment of deploying the positioning location system and developing a node map according to the present invention.

FIG. 2 illustrates an exemplary embodiment of deploying the positioning system and developing a node map according to the present invention. After the base station 104 and the primary reference nodes 102A-102C have been positioned alongside the building 100, the base station 104 and the primary reference nodes 102A-102C range with one another to determine their relative positions. The ranging process between the base station 104 and the primary reference nodes 102A-102C involves determining a signal direction and a distance.

To determine the signal direction, the base station 104 uses the direction finding antenna arrays 105A-105B and 106A-106B mounted on the vehicle in a two-dimensional (2-D) or three-dimensional (3-D) arrangement. The direction finding antenna arrays 105A-105B and 106A-106B are adapted to make Angle-of-Arrival (AOA) measurements on UWB signals transmitted by the primary reference nodes 102A-102C. The direction finding antenna arrays 105A-105B and 106A-106B measure the AOA for the received signals to determine from which direction each of the primary reference nodes 102A-102C is transmitting. Typically, the primary reference nodes 102A-102C are within a Line-of-Sight (LOS) of the direction finding antenna arrays 105A-105B and 106A-106B. However, the base station 104 may use other techniques that measure the reception time or signal strength of the transmitted signal to differentiate between received multipath signals to determine the angle of arrival, as is understood by those of skill in the art. In an alternative embodiment, the antenna arrays 105A-105B and 106A-106B are not required to be direction finding antennas. This alternative AOA approach is described in U.S. Pat. No. 6,760,387 (issued Jul. 6, 2004) to Langford et al., which is incorporated herein by reference in its entirety.

While the base station 104 is making AOA measurements, the base station 104 and the primary reference nodes 102A-102C are also measuring the distance between one another. In one embodiment, UWB signals are used to determine the distance between the base station 104 and the primary reference nodes 102A-102C. To determine the distances between each primary reference node 102A-102C and the base station 104, each primary reference node either individually, sequentially, or at the same time, transmits an UWB signal to the base station 104. The distance between a primary reference node and the base station 104 can be determined from the time-of-flight of the UWB signal between the primary reference node and the base station, using any one of various approaches involving one-way or round-trip signal transmission(s). These various approaches typically require identifying the leading edge of the received signal, which normally corresponds to the direct path between the nodes. Other approaches that are not based on leading edge detection, such as the ranging approach described in U.S. Pat. No. 6,111,536 (issued Aug. 29, 2000) to Richards et al., which is incorporated herein by reference in its entirety, require a direct path to exist between nodes to determine distance. Alternatively, the distance between two nodes can be determined based on signal amplitude as described in U.S. Pat. No. 6,700,538 (issued Mar. 2, 2004) to Richards, which is incorporated herein by reference in its entirety.

In the distance determination, the ranging process may or may not require synchronization between the base station 104 and the primary reference nodes 102A-102C. For the one-way ranging process, the primary reference nodes 102A-102C and the base station 104 may share a common clock signal, or may each have their own individual clocks and perform a synchronization process. In an alternative embodiment, the base station, upon receiving a signal from a primary reference node, may send an acknowledgement signal back to the primary reference node. When the primary reference node receives the acknowledgement signal, the primary reference node determines a round trip time to the base station and determines the distance to the base station based on the round trip time. This two-way ranging process does not require the primary reference node and base station to be synchronized. In a further alternative embodiment, the base station 104 may transmit an UWB signal that is received by the primary reference nodes 102A-102C, which each send acknowledgement signals from which the base station 104 measures round trip times and determines distances to the primary reference nodes. It is noted that either the base station or the primary reference node may determine the distance therebetween. Round trip ranging techniques are further described in U.S. Pat. No. 6,133,876 (issued Oct. 17, 2000) to Fullerton et al., and various combinations of one-way and round trip ranging approaches are described in U.S. Pat. No. 6,300,903 (issued Oct. 9, 2001) to Richards et al., each of which is incorporated herein by reference in its entirety. Another alternative embodiment involves differential time of arrival (DTOA) techniques as described in U.S. Pat. No. 6,054,950 (issued Apr. 25, 2000) to Fontana, which is incorporated herein by reference.

Once the ranging process is complete, the base station 104 and each primary reference node 102A-102C store the relative distances to one another in a range matrix. The range matrix stores a group of one or more distance measurements to one or more nodes, and a node identification (ID) that corresponds to distance measurement to each of the one or more nodes. The range matrix includes relative distance and node ID information for each node that the node communicates with, as well as an age of the distance data and a quality of range measurement metric(s) as described below. For example, in the present embodiment, the range matrix of the base station 104 includes a node ID for each of the primary reference nodes 102A-102C. For the node ID of primary reference node 102A, the range matrix includes a distance measurement between the base station 104 and the primary reference node 102A. Similar information is included for primary reference nodes 102B-102C. Likewise, at the primary reference node 102A, the range matrix of the primary reference node 102A includes a node ID for each of the primary reference nodes 102B-102C and for the base station 104, and also includes a distance measurement for each. In an alternative embodiment, the range matrix stores a timing measurement between each of the primary reference nodes 102A-102C and the base station 104, and a distance is derived from the timing measurement. After the AOA measurements and the distance between the base station 104 and the primary reference nodes 102A-102C are known, the base station 104 uses the range matrix to determine its position relative to the primary reference nodes 102A-102C relative, as will be discussed later in detail. The base station may, for example, be the (0,0) coordinate of an x-y coordinate system. Alternatively, a primary reference node or other location may be chosen for the (0,0) coordinate.

In addition to each node maintaining a range matrix, the nodes may also periodically communicate their range matrix information with other nodes and the base station. Such communication can be performed using UWB communications capabilities or using non-UWB communications capabilities such narrowband wireless communications methods. Communication of range matrix information among nodes enables each node to have information on all other nodes in the PLS, regardless of whether each node can range with another node. Rather than transmitting the range information for a single node, the range matrix can be transmitted, which is a data set including ranging information for all nodes within the PLS. Because each node maintains a range matrix and can communicate their range matrix information, the base station 104 can obtain range information for all nodes by communicating with only one primary reference, secondary reference, or non-fixed node. The maintenance and communication of range matrix information among nodes is further discussed in relation to FIGS. 20A and 20B. If range information is kept locally, every node can calculate its own position and communication it to the other nodes.

The base station 104 uses the range matrix information to create an initial node map that identifies the relative positions of the base station 104 and the primary reference nodes 102A-102C. In the node map, the primary reference nodes 102A-102C are reference points relative to the base station 104. The node map is used to develop a graphical representation of the relative positions of the primary reference nodes 102A-102C and the base station 104. A graphical user interface (GUI) is also included in the base station 104 for displaying to a user the graphical representation of the node map. A node map view of the GUI displays the node map and the locations of the base station 104 and the primary reference nodes 102A-102C. The graphical representation of the node map view includes the relative positions of all nodes communicating directly or indirectly with the base station 104. The node map may also include nodes other than primary reference nodes 102A-102C, as is discussed below.

Secondary reference and non-fixed nodes may be added to the PLS. When a node is added, the node undergoes a similar ranging process as that described above between the primary reference nodes 102A-102C and the base station 104. To add a node, either the node itself, one of the primary reference nodes 102A-102C, the base station 104, or another secondary reference node initiates the ranging process with the node to determine the relative distance between them. The ranging process employed may differ from the ranging process between the primary reference nodes 102A-102C and the base station 104. For example, the ranging between the base station and the primary references may rely on a two-way measurement of time of arrival, whereas, the ranging between the primary and secondary references may use a one way time of arrival measurement or differential time of arrival measurement. It should be noted, however, that the present invention may use any variety of known ranging techniques found suited for a particular positioning application. An added node may listen for communicated position and/or may initiate ranging to other nodes.

In the ranging process for a secondary reference node or non-fixed node, the node (secondary reference or non-fixed) determines its distances relative to one or more other nodes, and the determined distances are placed in a range matrix. The range matrix of the node may include, for example, distances information to one or more of the primary reference nodes 102A-102C, the base station 104, secondary reference nodes, or non-fixed nodes. As the ranging process is completed, the range matrix information is communicated across the PLS network to the base station 104. The base station 104 updates the node map to include relative positions of the node, similar forming the node map, as described above.

In the preferred embodiment of the PLS described above, the position of base station 104 is determined by ranging with the primary reference nodes 102A-102C. As such, the base station could be described as a secondary reference node since it is a fixed node and because its position is determined via a ranging process. Although the base station could be used as a secondary reference node for ranging with other nodes, after performing ranging to determine its own position relative to the primary reference nodes, the base station does not perform ranging with other nodes an instead is devoted to performing other functions as later described.

In an alternative embodiment of the PLS, one or more of the primary reference nodes 102A-102C may be incorporated into the base station 104, in which case the position of base station 104 is also known relative to the one or more primary reference nodes 102A-102C. Under such an arrangement the base station could also be described as a primary reference node since its position is fixed and known. However, with this embodiment, the base station 104 typically would not perform ranging functions, which instead are performed by primary reference nodes 102A-102C.

In still another embodiment, the base station 104 itself may be configured to act as one or a plurality of primary reference nodes. Under this arrangement, the base station would perform ranging with secondary reference nodes to establish a 2-D (3-D) coordinate system. In one exemplary embodiment, the base station node would be a primary reference node that would typically only perform ranging with the three (or four) secondary reference nodes used to establish the 2-D coordinate system. Referring to FIG. 1, under such an arrangement, the vehicle 120 may place a base station 104 along side a building 100. Secondary references 102A-102C would be placed at unknown or arbitrary location relative to the base station 104. Ranging techniques would be employed to determine the relative locations of the secondary references 102A-102C in order to establish a coordinate system. Thereafter, secondary reference nodes 102A-102C would be used to determined ranges to other secondary reference nodes and/or non-fixed nodes.

FIG. 2 provides an example of an extensible position determination architecture. As shown, secondary reference nodes serve as additional reference points from which the position of either additional secondary reference nodes or non-fixed nodes can be determined. In FIG. 2, secondary reference nodes 108A and 108B perform ranging with primary reference nodes 102A-102C. The ranges (or distances) between the primary and secondary reference nodes are used to determine the positions of the secondary reference nodes. Once the positions of secondary reference nodes have been determined, their determined position can be used to determine positions of additional secondary reference nodes or non-fixed nodes. As depicted, secondary reference node 108C performs ranging between primary reference node 102B and secondary reference nodes 108A and 108B. Secondary reference node 108D performs ranging with secondary reference nodes 108A-108C.

Figure 3:
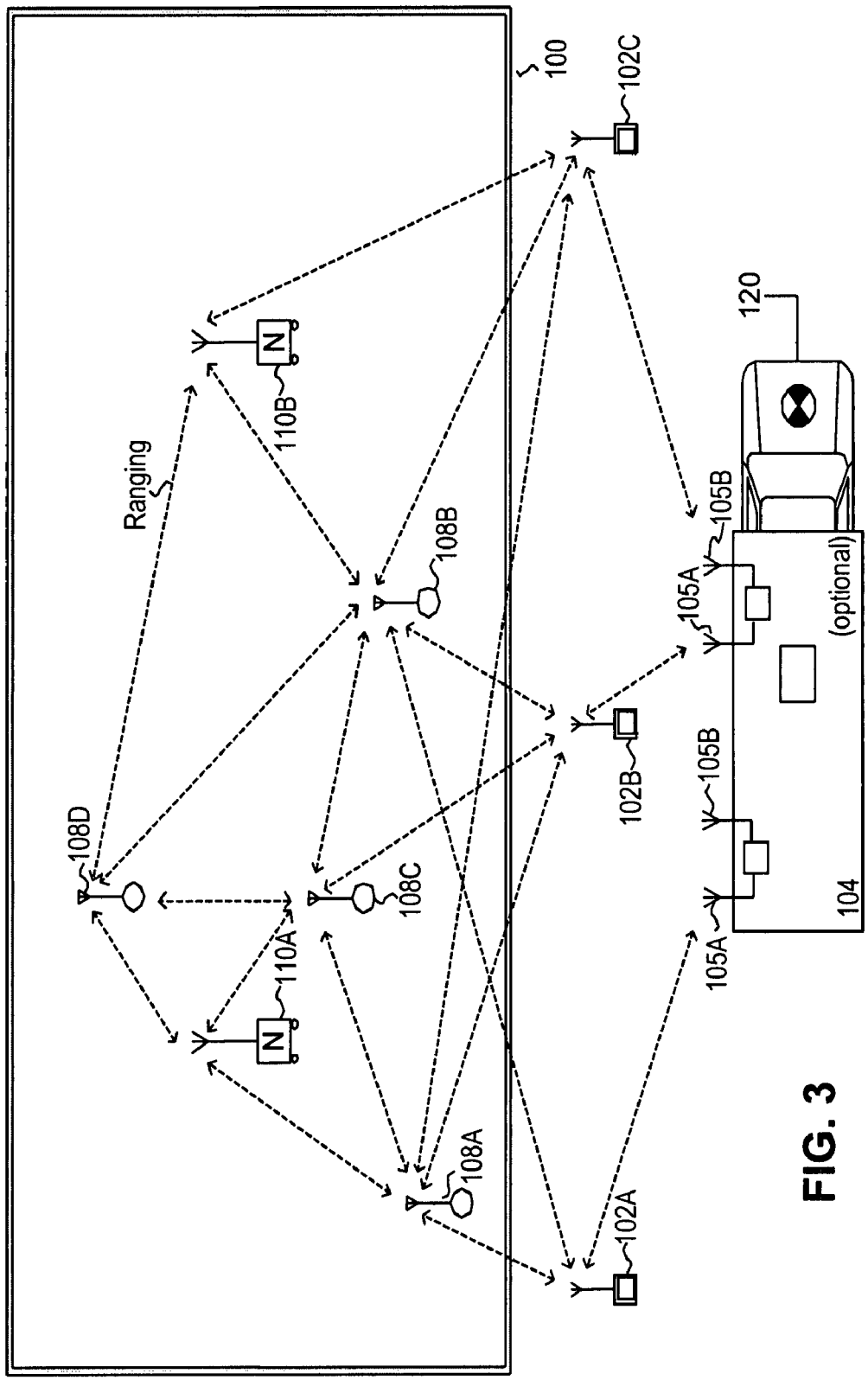
FIG. 3 illustrates ranging by position location system of FIG. 2 to exemplary non-fixed nodes.

FIG. 3 illustrates an exemplary embodiment of tracking movement of non-fixed nodes 110A-110B within the building 100 according to the present invention. Similar to adding the secondary reference nodes 108A-108C to the PLS, the non-fixed nodes 110 also range with the base station and the primary and secondary reference nodes to determine their relative positions. Since the non-fixed nodes 110A-110B may move, the ranging process is repeated periodically in order to appropriately update the range matrix information and the node map to reflect the movement of the non-fixed nodes.

In one exemplary embodiment, the non-fixed nodes 110A-110B may simultaneously range with three or more primary reference nodes 102A-102C, three or more secondary reference nodes 108A-108D, or any combination of three or more primary and secondary reference nodes to establish a two-dimensional or three-dimensional coordinate system. Similar to the process discussed for the primary and secondary reference nodes, the non-fixed nodes 110A-110C also range with the other nodes by communicating UWB signals. From the communicated UWB signals, distances between the non-fixed nodes 110A-110B and the primary reference nodes 102A-102C and/or secondary reference nodes 108A-108D are determined.

Once the distances are determined, the non-fixed nodes 110A-110B update a range matrix that includes a node ID and a determined distance to each of the nodes, as described above. However, the base station, the primary reference nodes, and the secondary reference nodes may also determine the distance to the non-fixed node to update their range matrix. The range matrix information can be relayed to the base station 104 from either of the non-fixed nodes 110A-110B, the primary reference nodes 102A-102C, or the secondary reference nodes 108A-108D. In one embodiment, the secondary reference nodes 108A-108D relay the range matrix information to the base station 104 through the primary reference nodes 102A-102C. In this embodiment, the secondary reference nodes 108A-108C collect and transmit range matrix data from multiple nodes (primary, secondary, and non-fixed) and transmit the range matrix information to the primary reference odes 102A-102C. However, in an alternative embodiment, the secondary reference nodes 108A-108D may directly relay the range matrix information to the base station 104. In a further alternative embodiment, any of the primary, secondary, or non-fixed nodes relays the range matrix information to the base station 104.

Periodically the base station 104 receives range matrix information from the primary or secondary reference nodes to update the range matrix of the base station 104. The range matrix of the base station 104 may be updated at specific time intervals, or may be updated when new information is detected in the range matrix information, such as, for example, when a new node is added to the PLS, as described above. Examples of updates include an addition of a new node and its corresponding range information and a change in information pertaining to a non-fixed node such as its position, location, speed, direction of travel, and changes in any of these. The base station 104 uses the range matrix to calculate the relative positions of all of the nodes, and, if necessary, to update the node map to reflect any position changes of the nodes. In one embodiment, the base station 104 uses differencing between a current range matrix and a previous range matrix to determine changes between the two. If differences are detected, then the base station may calculate relative positions for all nodes in the PLS, or alternatively, may only make calculations based on the differences. In a further alternative embodiment, certain nodes such as primary reference nodes and secondary reference nodes are updated at a certain frequency, which is less often than other nodes, such as non-fixed nodes.

After calculating the differences between the range matrices, the base station 104 discovers range updates, calculates corresponding position updates, and updates the display of the GUI to reflect the position updates. Once the base station 104 has updated the node map, the node map may be transmitted by the base station 104 in the form of a position table to the non-fixed nodes, either directly or indirectly, via one or more primary and/or secondary reference nodes. The position table is received by the non-fixed nodes 110A-110B, which can use the position table to display icons representing the positions of each of the non-fixed nodes 110A-110B, primary reference nodes 102A-102C, secondary reference nodes 108A-108H, and the base station 104 in a GUI similar to that of the base station 104.

Figure 4A:
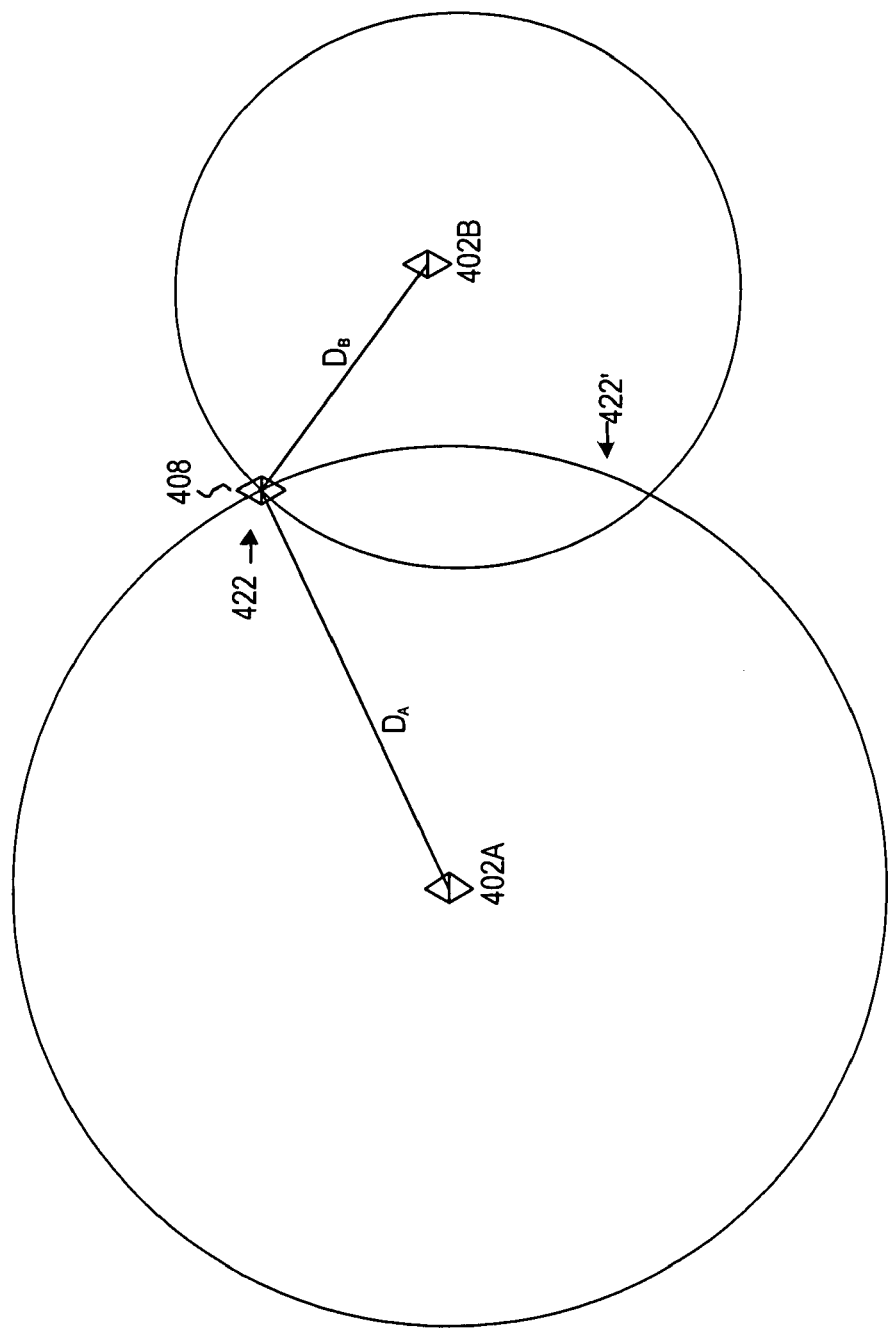
FIG. 4A illustrates two possible positions of a node determined given range measurements with two reference nodes.

FIG. 4A illustrates an exemplary embodiment of the base station 104 using triangulation to determine the location of a secondary reference node relative to two primary reference nodes according to the present invention. Once a node is able to range to two or more other nodes, the location of the node may be determined using triangularization and the node may be placed in the node map. The position of a node can be determined through calculating a distance between the node and two (or more) other nodes using triangularization/multi-lateration to determine a 2-D (or 3-D) position of the node relative to the other nodes. Triangularization may be used to determine the location of any node with respect to two or more other nodes, such as a primary reference node, a secondary reference node, a base station, or a non-fixed node.

One embodiment uses triangularization to determine the position of a secondary reference node 408 relative to primary reference nodes 402A and 402B. Either the secondary reference node 408 or one of the primary reference nodes 402A and 402B initiates a ranging process such as those described above from which the distance $D_A$ between the primary reference node 402A and the secondary reference node 408 is determined as well as the distance $D_B$ between the primary reference node 402B and the secondary reference node 408. As described above, the distances between the nodes can be determined by either the primary reference nodes 402A and 402B or the secondary reference node 408 depending on the ranging process employed and which node initiates it. Once determined, the distances $D_A$ and $D_B$ are included in the range matrix along with node IDs of the respective nodes and are communicated to the base station. In the calculation at the base station, the distance $D_A$ and the distance $D_B$ respectively are radii of circles (or arcs) having the respective primary reference nodes 402A-402B at the center. The two circles intersect at two locations 422 and 422', which correspond to the two possible locations of the secondary reference node 408. The ambiguity in the location of the secondary reference node 408 may be resolved by entering other known information on the secondary reference node at the base station, such as removing impossible positions due to a physical barrier, or other information such as speed, direction, position relative to a known physical barrier, etc. For example, in relation to FIG. 3, possible location 422' could be eliminated based on a priori knowledge. For example, a rule may be used that would require secondary reference nodes to be placed at locations further away from the vehicle 120 than the primary reference nodes. Any location that is found to violate this rule would be discarded in order to resolve the ambiguity. A position ambiguity may also be resolved by ranging with another primary (or secondary) reference node, as will be described below.

Figure 4B:
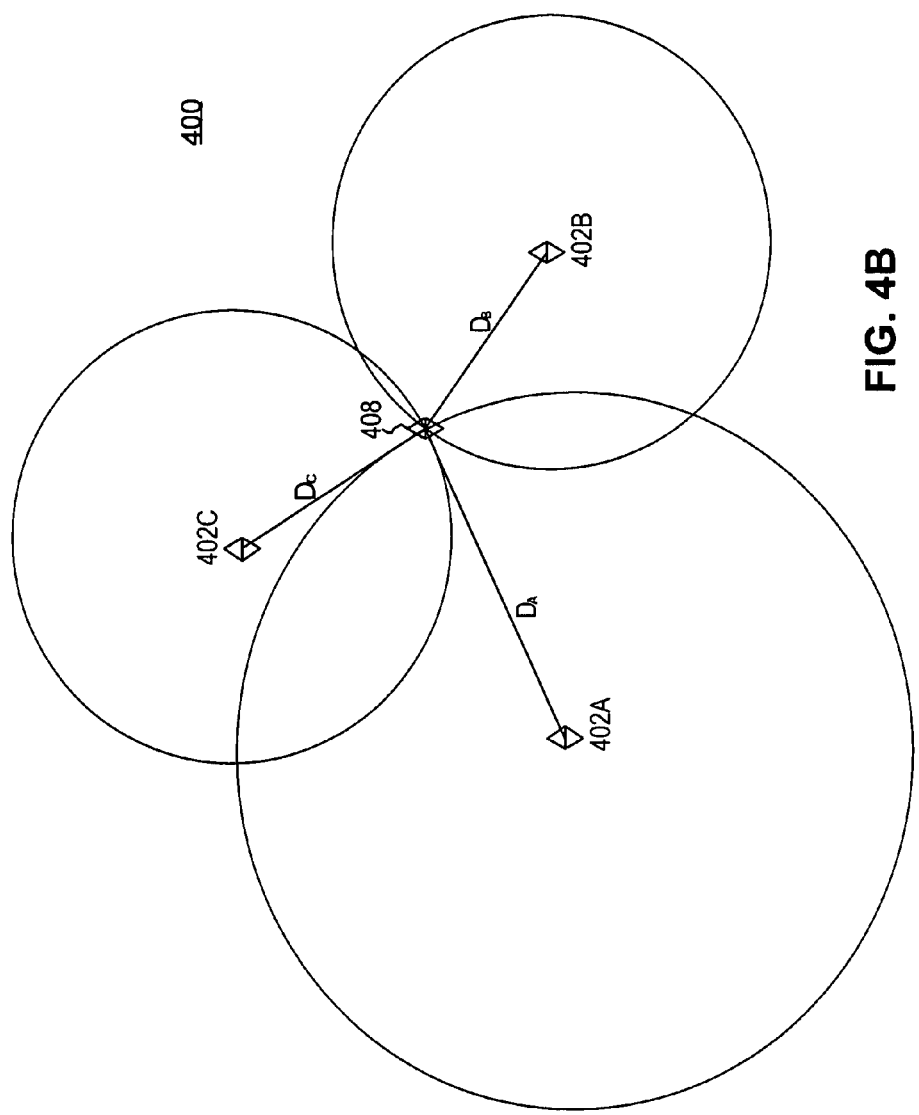
FIG. 4B illustrates a two-dimensional position of a node determined given range measurements with three reference nodes.

FIG. 4B illustrates an exemplary embodiment using triangulation between three primary reference nodes to determine the location of a secondary reference node. In this embodiment, the primary reference nodes 402A-402C each determine the distance to the secondary reference node 408 either by measuring the two-way (round trip) time of arrival or the one-way time of reception. The primary reference node 402A calculates the distance $D_A$ between the primary reference node 402A and the secondary reference node 408. Similarly, the primary reference node 402B calculates the distance $D_B$ between the primary reference node 402B and the secondary reference node 408, and the primary reference node 402C calculates the distance $D_C$ between the primary reference node 402C and the secondary reference node 408. In an alternative embodiment, the secondary reference node 408 calculates the distance between the respective primary reference nodes 402A-402C. The distances $D_A$, $D_B$, and $D_C$ respectively can be used to form circles of radii $D_A$, $D_B$, and $D_C$ about the respective primary reference nodes 402A-402C. All three circles intersect at a single location that corresponds to the location of the secondary reference node 408, thus giving a two dimensional location of the secondary reference node 408. It is noted that the two dimensional location may be used to form a three dimensional location by entering other information about the non-fixed node, such as a known height, direction of movement, etc. Otherwise, an additional node at a different elevation may be used to determine a three-dimensional location for the non-fixed node, as is understood by those of skill in the art. Alternatively, various devices such as altimeters, electronic compasses, magnetic compasses, and other navigational devices can be used to determine elevation of a node. A similar triangulation process is used to determine the location of the non-fixed nodes using a combination of any three primary or secondary reference nodes. The present triangularization embodiments are intended to illustrate the invention, and are not intended to be exhaustive. It is noted that any combination of distances between the base station, primary reference nodes, secondary reference nodes, and non-fixed nodes may be used in triangularization, as is understood by those skilled in the art.

Figure 5:
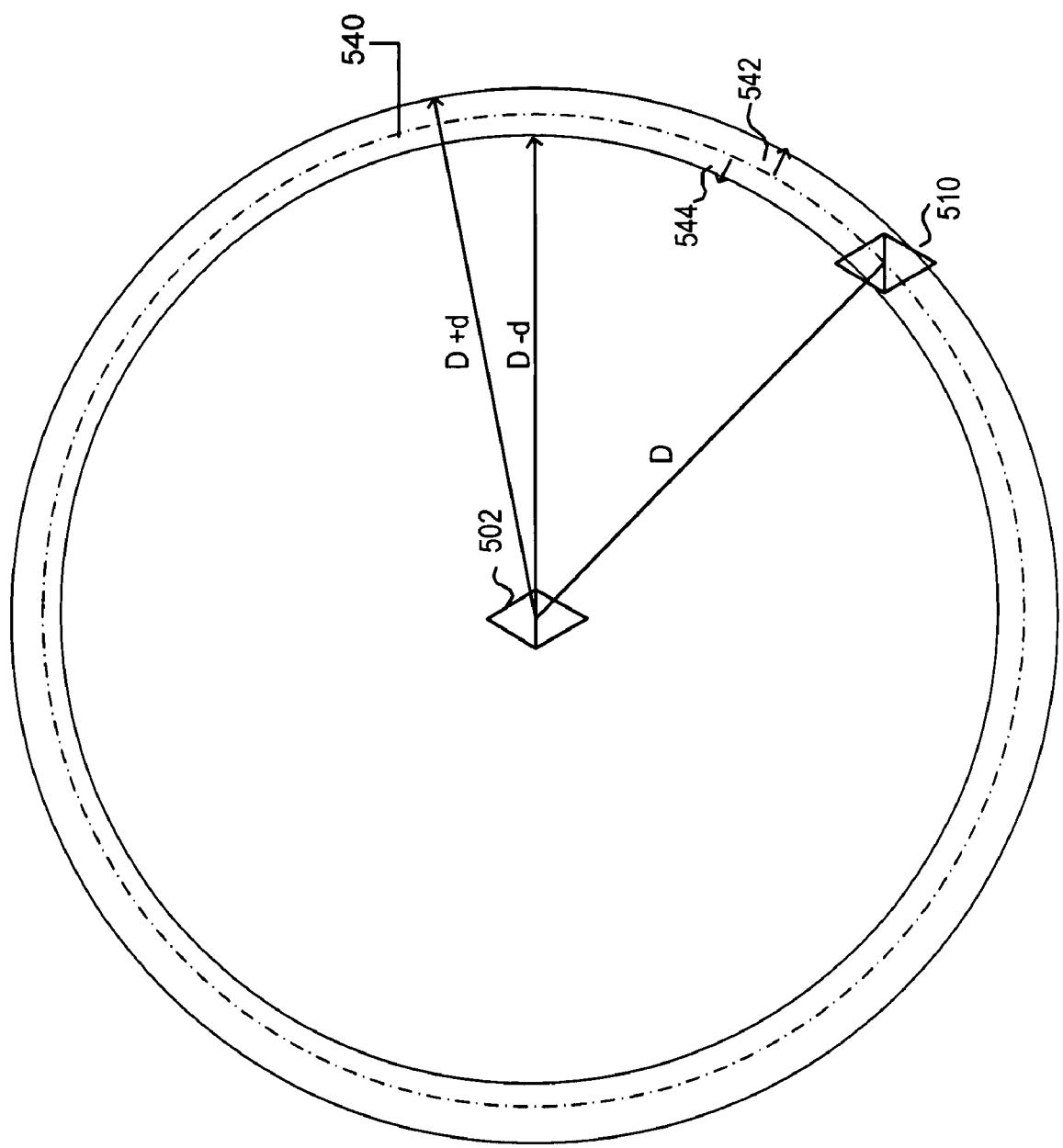
FIG. 5 illustrates an exemplary error band.

FIG. 5 illustrates an exemplary embodiment of an error in determining the distance between a primary reference node 502 and a non-fixed node 510 using UWB signals according to the present invention. During ranging, the primary reference node 502 transmits an UWB signal to the non-fixed node 510 to determine the distance from the primary reference node 502 to the non-fixed node 510, which corresponds to the distance D. As illustrated, a primary reference node 502 is ranging to a non-fixed node 510 with the primary reference node 502 being at the center of a circle 540 with a radius D. A measured time of flight for UWB signals translates to a distance D between the primary reference node 502 and the non-fixed node 510. However, a certain amount of error occurs in this determination, as illustrated by the circle 542 of radius D+d and the circle 544 of radius D−d. The accuracy of a given distance calculation depends on the accuracy of the time clock used by the primary reference node 502 and/or by the non-fixed node 510, depending on which node performs the calculation and whether a one-way or round-trip signal transmission approach is used or not. The accuracy of a given distance calculation may also be impacted by the speed of signal propagation through a given multipath environment (e.g., through a concrete or sheet rock wall). Although, such 'propagation' errors could also be used to assess ranging error, for simplicity UWB signals are assumed to propagate at the speed of light regardless of the propagation path. Given this assumption, a time measurement is only as accurate as the clock(s) used by the measuring node(s), where a time-based distance measurement has a related distance measurement error for each time measurement period. The error band is caused by imprecision in the timing measurement, which results in a distance measurement error of ±d causing an error band where the non-fixed node 510 is determined to be located a distance D±d apart from primary reference node 502 as represented by the error band.

Figure 6:
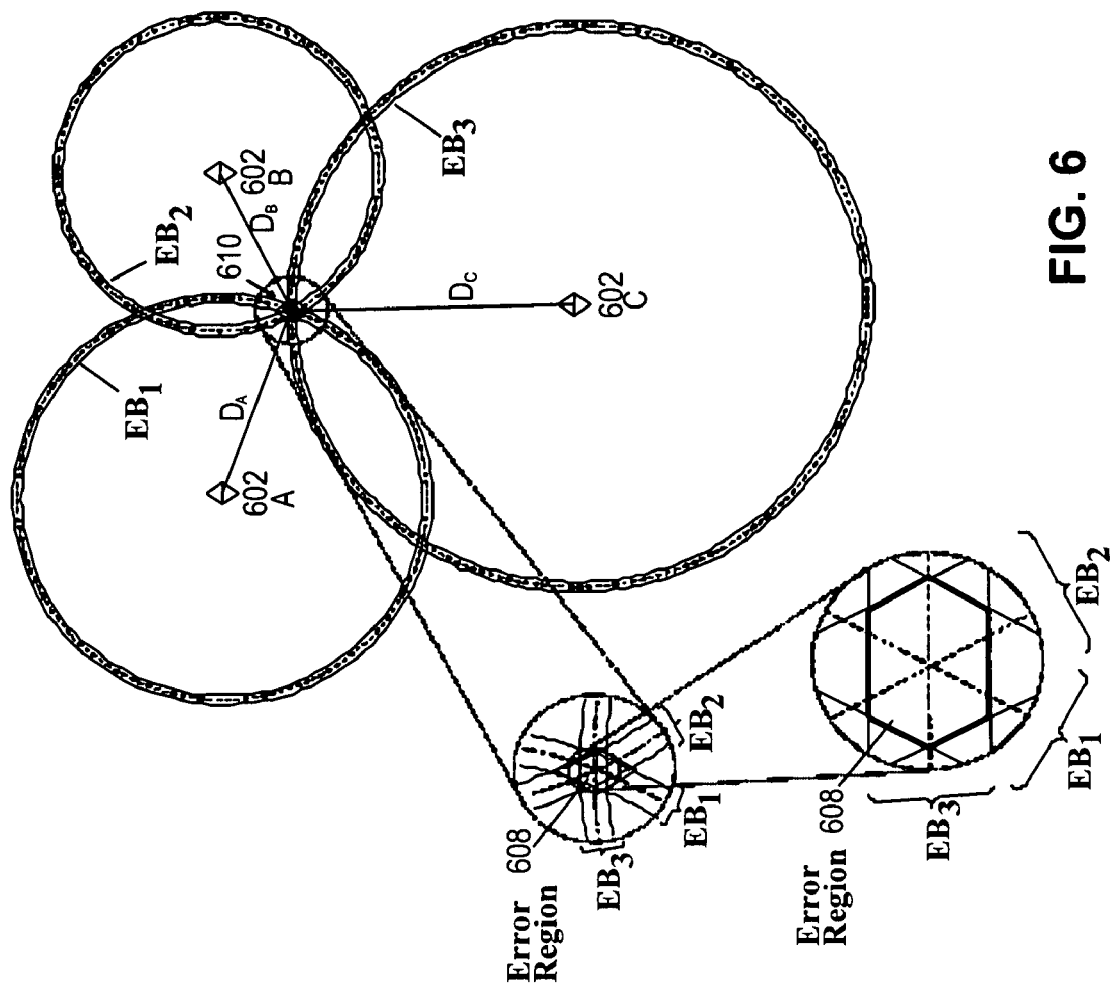
FIG. 6 illustrates an exemplary error region.

FIG. 6 illustrate an exemplary embodiment of an error region about a determined (calculated) position, which results from the distance measurement errors of three range measurements used to determine distances between three reference nodes and a non-fixed node according to the present invention. Primary reference nodes 602A-602C are respectively positioned at distances $D_A$, $D_B$, and $D_C$ relative to the non-fixed node 610. The primary reference nodes 602A-602C are located at the respective centers of circles of radius $D_A$, $D_B$, and $D_C$. Each of the determined distances from the primary reference nodes 602A-602C to the non-fixed node 610 has an Error Band (EB), depicted as $EB_1$ for primary reference node 602A, $EB_2$ for primary reference node 602B, and $EB_3$ for primary reference node 602C. The EB is associated with timing measurement errors, as described above. When three (or more) distances are calculated using timing measurements, an error region 608 is formed at the intersection of the error bands $EB_1$, $EB_2$, and $EB_3$, within which the non-fixed node 610 is located. Also shown are enlargements of the error region 608 to further illustrate the intersection of the error bands $EB_1$, $EB_2$, and $EB_3$.

Figure 7A:
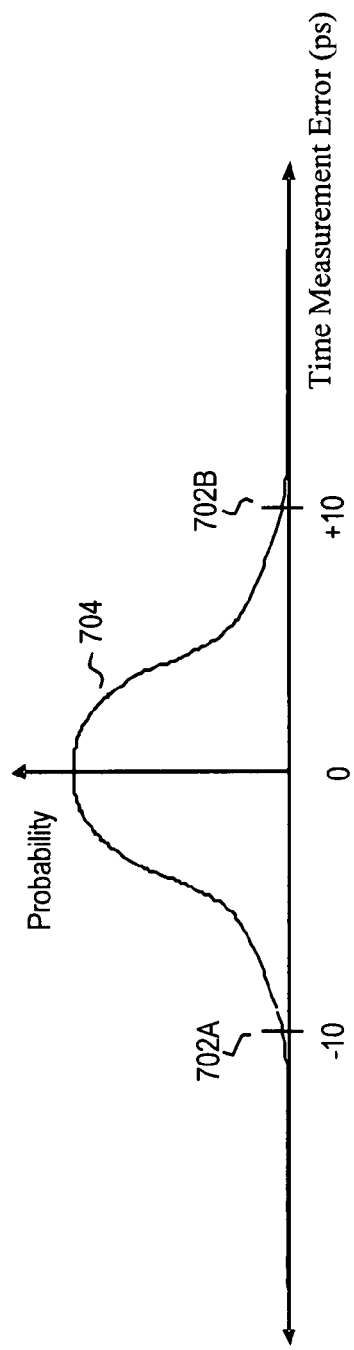
FIG. 7A illustrates an exemplary probability density function of time measurement error.
Figure 7B:
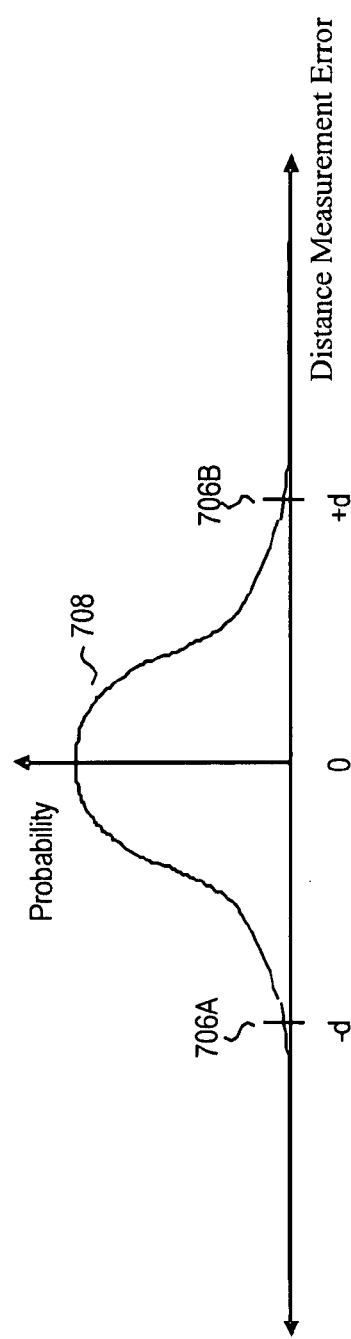
FIG. 7B illustrates an exemplary probability density function of distance measurement error.

FIGS. 7A-7B illustrate exemplary embodiments of probability functions for timing measurement errors and distance measurement errors according to the present invention. Time measurement error may be modeled as a probability function. As shown in FIG. 7A, a Gaussian-like probability function models the time measurement error in picoseconds (ps). Timing measurements are often within some constant time error, e.g., ±10 picoseconds, where the time measurement error corresponds to a distance measurement error, $\pm d_{error}$ as shown in FIG. 7B. This distance measurement error can be accounted for in impulse positioning calculations. In this embodiment, most of the timing error is within ±10 picoseconds, but a non-zero probability of error exists that the timing error is greater than 10 picoseconds. Ideally, the probability function would be very narrow and steep around zero, with the outermost edges of the probability function along the x-axis being very close to zero. However, the probability function may have less of a hump than depicted, and may also approach being flat. It should also be understood that probability functions are not necessarily symmetrical and may not generally have a Gaussian-like shape, as is understood by those of ordinary skill in the art.

FIG. 7B illustrates an exemplary embodiment of a probability function of the distance measurement error according to the present invention. As depicted, the distance error is shown as a Gaussian-like probability function, with a majority of the error within a distance ±d. This implies that for a given time measurement, the distance error is most likely less than a distance d away from a reference. The zero reference shown in FIG. 7B would correspond to the determined distance when used with the invention. In other words, a probability function like that shown in FIG. 7B would span the cross section of an error band. It is again noted that the most probable correct distance is not necessarily at the center of the error band, and depends on the shape of probability density function used. As shown, the distance error is greater than the distance d for a small non-zero probability.

Figure 7C:
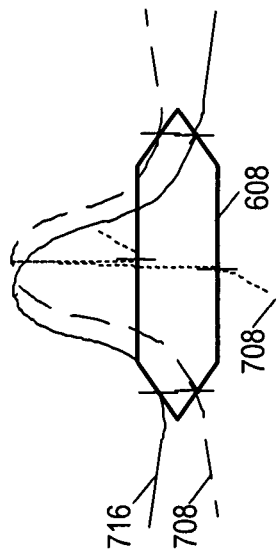
FIG. 7C illustrates exemplary probability density functions overlaid over an error region.
Figure 7D:
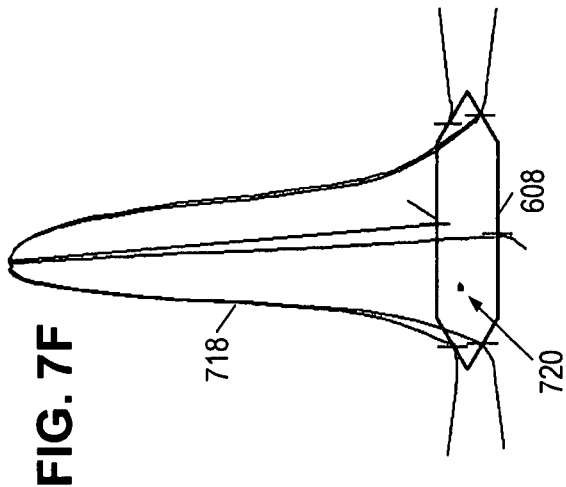
FIG. 7D illustrates an exemplary joint probability density function.
Figure 7E:
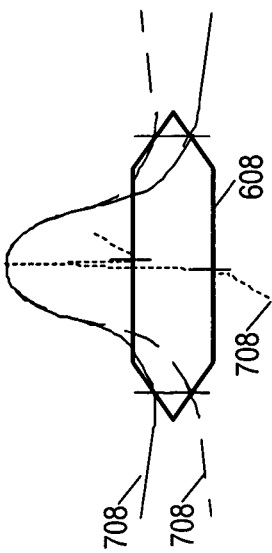
FIG. 7E illustrates exemplary probability density functions overlaid over an error region.
Figure 7F:
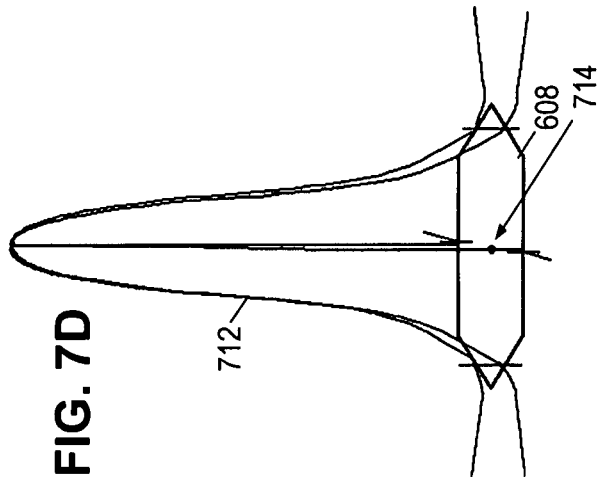
FIG. 7F illustrates an exemplary joint probability density function.

Given probability density functions for each error band used in a position calculation, a joint probability density function can be determined to identify a most likely position of a node within the error region. FIG. 7C depicts the probability density function 708 of FIG. 7B being applied for each of the three error bands of FIG. 6 where each probability density function 708 is overlaid across a cross section of error region 608 corresponding to one of the error bands. When multiplied together the three probability functions produce a joint probability density function 712, which resembles a three dimensional surface, as shown in FIG. 7D. Because all three probability functions 708 used correspond to a traditional Gaussian distribution, the peak of the resulting joint probability density function 712 is at its center and thus the determined position 714 of the non-fixed node corresponds to the center of the error region. However, the probability density functions used can vary from each other in shape, amplitude, or in some other manner as necessary in which case the peak of the resulting joint probability density function may not correspond to the center point of the error region. FIG. 7E presents an example where one of the probability density functions 716 is skewed such that it is not symmetrical around a center point. As shown in FIG. 7F, this skewing of one of the probability density functions results in the peak of the resulting joint probability function 718 also being skewed and thus the determined position 720 of the non-fixed node corresponds to a point that is not at the center of the error region.

Having described the concept of an error region about a position determined based upon ranging measurements relative to primary reference nodes, the concept of compounding ranging error in accordance with the invention is now described. Basically, compounding ranging error involves calculating a position based on ranging measurements relative to at least one other position that was also calculated based on ranging measurements. Referring again to FIG. 6, the error region 608 is shown relative to three known positions of reference nodes 602A-602C. Had any one of the three primary reference nodes 602A-602C been a secondary reference node then the position of the secondary reference node would itself be within some error region such that the position of the non-fixed radio 610 would be within a larger composite error region.

Figure 7G:
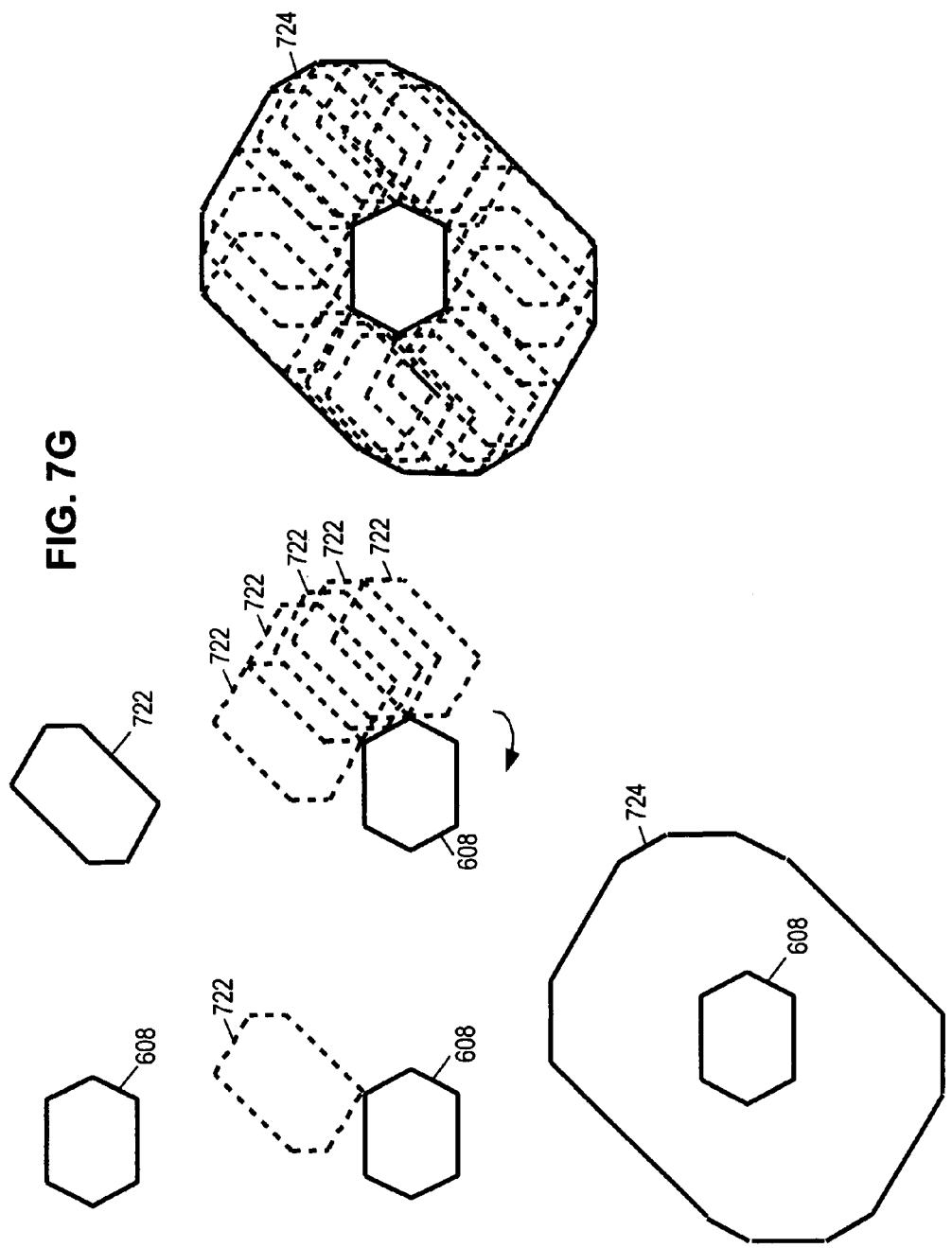
FIG. 7G illustrates an exemplary first error region compounding with an exemplary second error region to produce a composite error region.
Figure 7H:
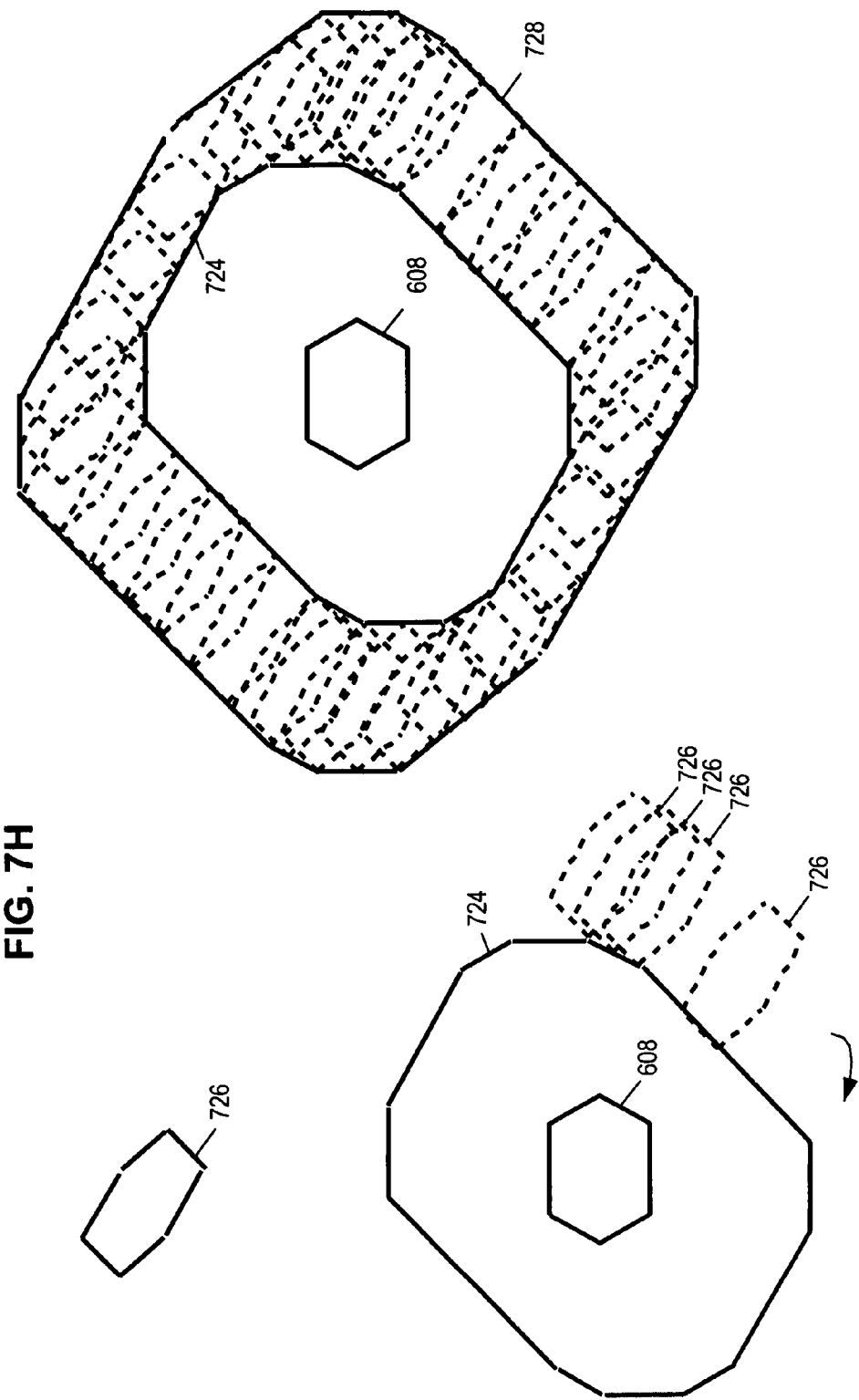
FIG. 7H illustrates an exemplary third error region compounding with the composite error region of FIG. 7G.

An example of compounding ranging error is shown in FIG. 7G. In FIG. 7G, an error region 608 corresponds to ranging error with one of the primary reference nodes of FIG. 6 instead being a secondary reference node having an error region 722. Thus, each point within error region 608 may vary in accordance with error region 722. As such, error region 722 can be repeatedly placed about the perimeter of error region 608 to produce a composite error region 724 boundary. As additional secondary reference nodes are used, additional ranging error is compounded. FIG. 7H depicts an example of an additional layer of compounding ranging error where an additional primary reference node of FIG. 6 is instead a secondary reference node having a ranging error region 726. As with the prior example, the ranging error is placed about the perimeter of (composite) error region 724 to produce (composite) error region 728. It is important to note that the outer boundary of (composite) error region 728 is the same regardless of the order in which the ranging errors of error regions 722 and 726 are compounded with error region 608.

In addition to inaccuracies in distance caused by timing measurements, the accuracy of a positioning calculation can also be adversely impacted by the locations of the primary or secondary reference nodes relative to the non-fixed node. Specifically, if an angle between a pair of primary and/or secondary reference nodes and the non-fixed node is excessively acute (i.e., approaches 0°), the accuracy of the calculation used to determine the location of the non-fixed node can be unacceptable. This situation typically occurs when a non-fixed node is a significant distance away from the primary and/or secondary reference nodes and also occurs whenever a non-fixed node is at a position in near alignment (i.e., on the same line) with two (or more) reference nodes.

Figure 8:
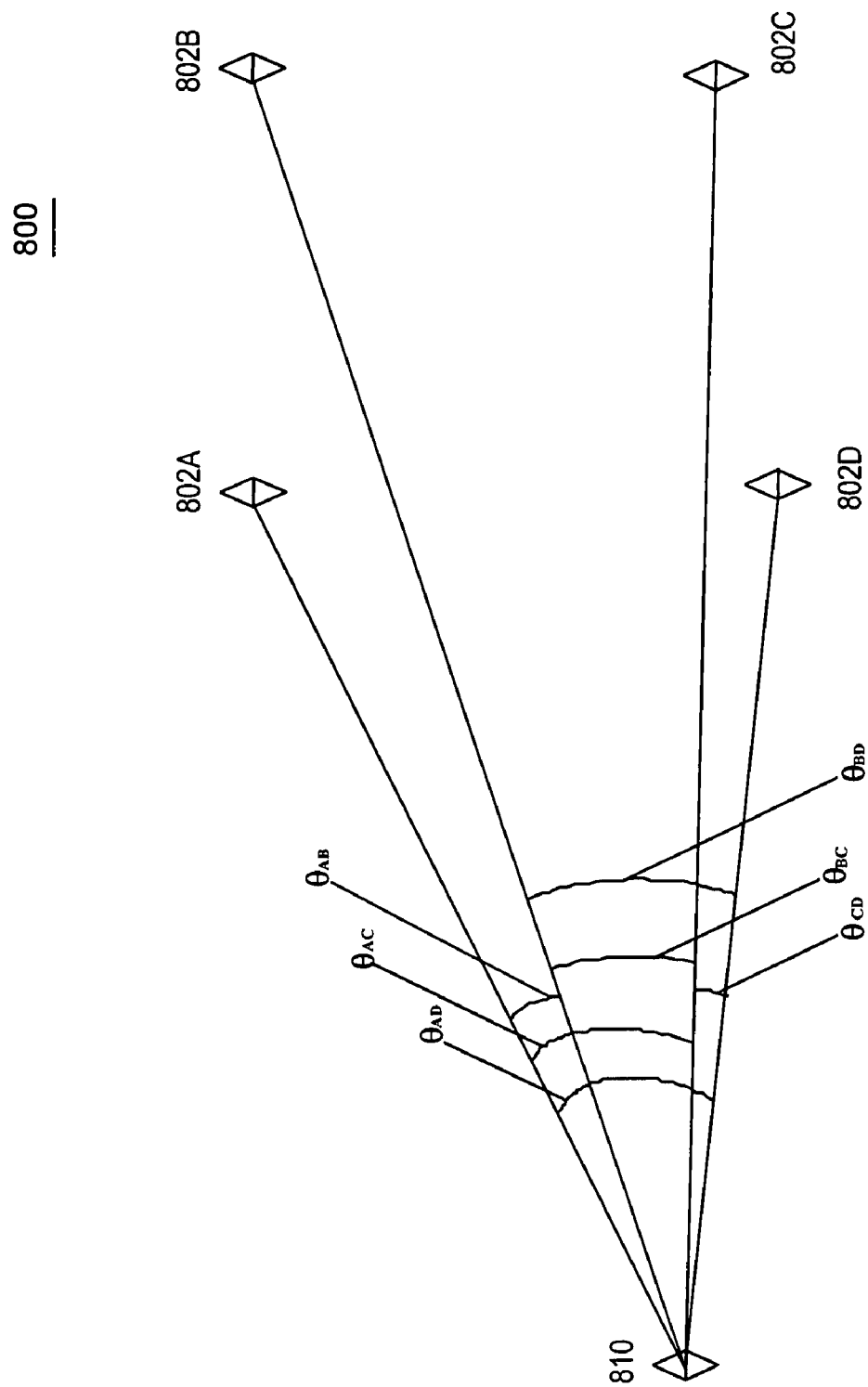
FIG. 8 illustrates exemplary acute angles between a node and reference nodes.

FIG. 8 illustrates an exemplary embodiment of acute angles between multiple primary reference nodes relative to a non-fixed node according to the present invention, where for simplicity and clarity purposes, nodes are represented as diamond dipole antennas. As shown, each angle between every pair of primary reference nodes 802A-802D with respect to a non-fixed node 810 forms an acute angle θ. As depicted, the angle $\theta_{AB}$ is between primary reference nodes 802A and 802B, the angle $\theta_{AC}$ is between primary reference nodes 802A and 802C, the angle $\theta_{AD}$ is between primary reference nodes 802A and 802-D, the angle $\theta_{CD}$ is between primary reference nodes 802C and 802-D, the angle $\theta_{BC}$ is between primary reference nodes 802B and 802C, and the angle $\theta_{BD}$ is between primary reference nodes 802B and 802-D. Using one or more excessively acute angles in the position calculation elongates the error region from the timing measurement, as described below.

Figure 9:
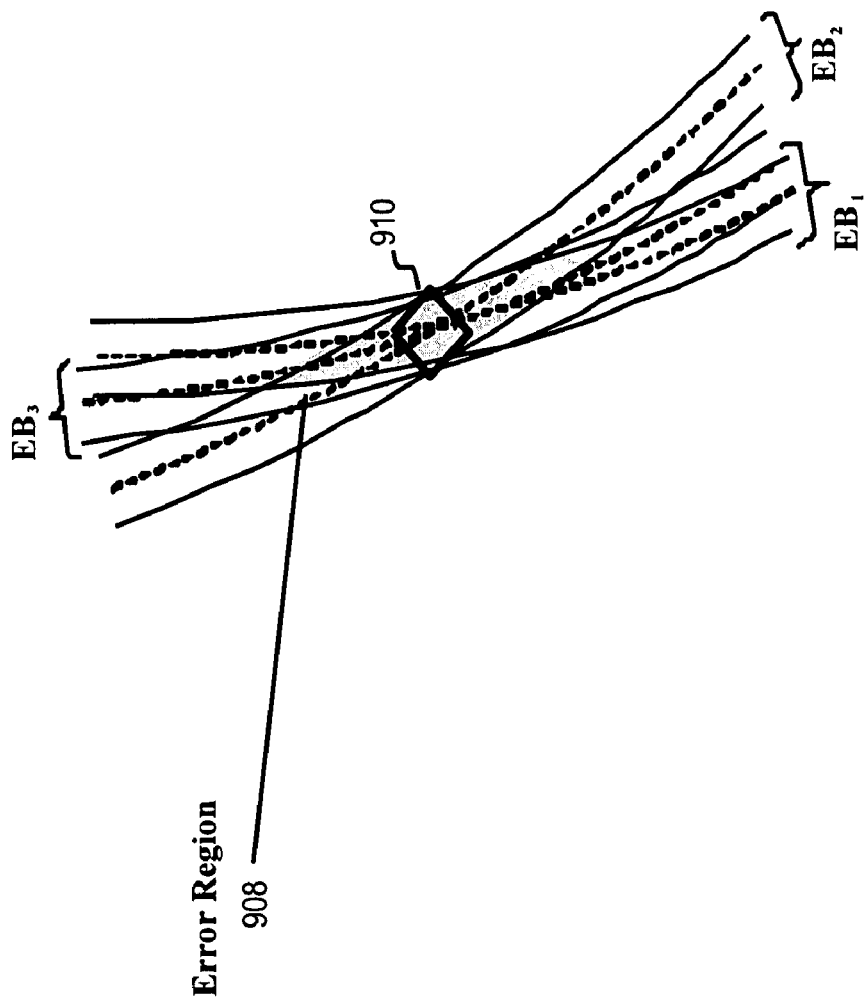
FIG. 9 illustrates an exemplary elongated error region.

FIG. 9 illustrates an exemplary embodiment of an elongated error region 908 resulting from using one or more excessively acute angles in the position calculation according to the present invention. In this embodiment, the intersection of error bands $EB_1$-$EB_3$ forms an elongated error region 908. The elongated error region 908 results from excessively acute angles being between each pair of primary (or secondary) reference nodes relative to the non-fixed node 910. This causes the error bands $EB_1$-$EB_3$ to overlap such that the resulting error region is elongated along an axis generally perpendicular to the average direction of the references relative to the non-fixed node. Consequently, the positioning error in the direction of the elongation can be significant, and may result in unacceptable positioning accuracy. Moreover, as the non-fixed node 910 travels farther away from the primary or secondary reference nodes, the angles with the primary or secondary reference node pairs becomes even more acute (i.e., approach 0°), which results in further elongation of the error region 908. As the distance between the non-fixed node and the other nodes increases, the circles that correspond to the determined distances between the non-fixed node and the others nodes become increasingly concentric, and at a great enough distance, multiple nodes may be viewed as a single node, which lowers the dimension of the position that can be calculated. To overcome these problems, the present invention may use alternate combinations of nodes to extend the distances at which UWB positioning architectures have acceptable positioning accuracy, as described below. Various other geometry-based metrics can also be established to assess position determination accuracy including Geometric Dilution of Precision (GDOP) methods well known in the art.

Figure 10A:
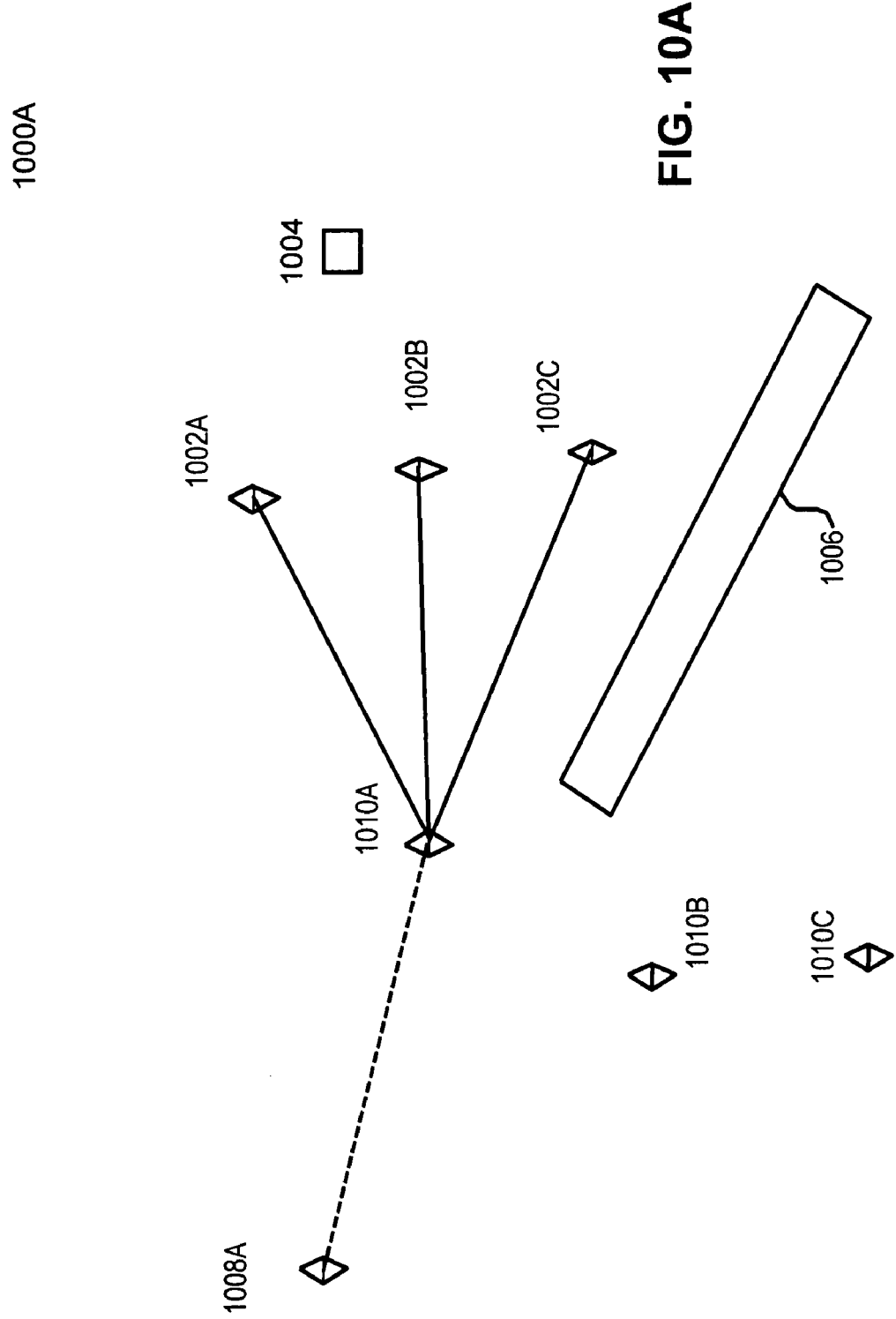
FIG. 10A illustrates an exemplary PLS using a secondary reference node to determine a position.
Figure 10B:
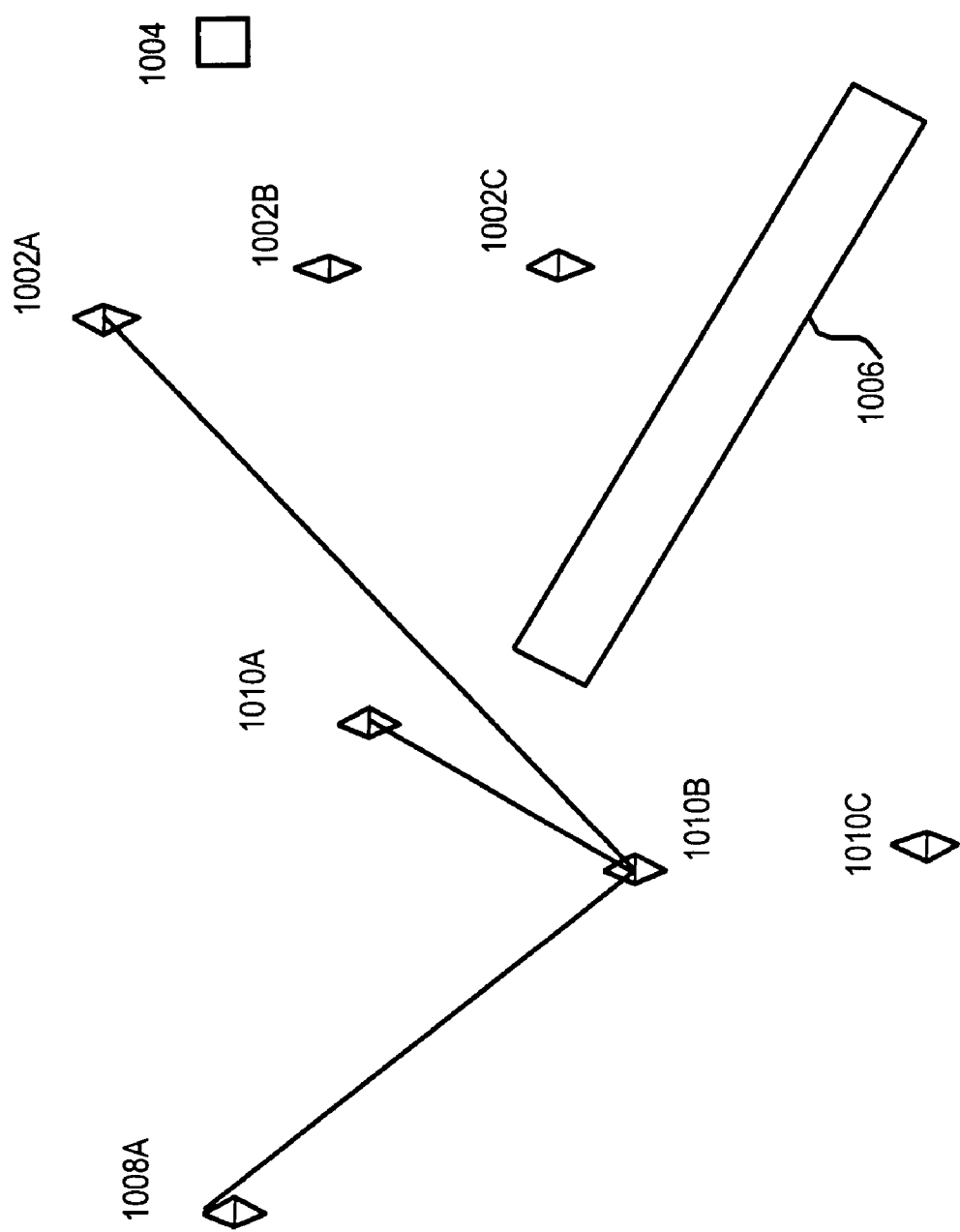
FIG. 10B illustrates an exemplary PLS using a non-fixed node as a secondary reference node.

FIGS. 10A-10B illustrate an exemplary embodiment of an extensible PLS tracking non-fixed nodes 1010A-1010C that overcomes the problems in positioning accuracy. Given that a non-fixed node can be located at excessively acute angles relative to a given pair of primary (and/or secondary) reference nodes, and that a direct path between a primary or secondary reference node and the non-fixed node may not exist, the present invention performs alternative positioning calculations based upon the acceptability of the positions of various combinations of primary, secondary, and/or non-fixed nodes relative to the non-fixed node (or secondary reference node) for which a position is to be determined. In this embodiment, the nodes of the extensible PLS collaborate with the base station to attain the highest confidence level in the accuracy of a calculated position for a given node. To accomplish this, each node maintains a range matrix on other nodes with which it communicates to allow the base station 104 to calculate a position for a node with the highest confidence level possible (or desirable). In one embodiment, a non-fixed node may be used as a secondary reference node to calculate the position of another non-fixed node. This may occur when the position of the non-fixed node is known and it becomes necessary to extend positioning measurements to another non-fixed node to increase confidence levels in a distance calculation.

As shown in FIG. 10A, the primary reference nodes 1002A-1002C and the secondary reference node 1008A are ranging with and tracking non-fixed node 1010A. In this embodiment, each pair of primary reference nodes 1002A-1002C form angles that are not overly acute with respect to the non-fixed node 1010A, and are also within a direct LOS of the non-fixed node 1010A. The distance measurements result in a small error region, and thus triangularization results in an acceptable positioning measurement of the non-fixed node 1010A.

Additionally, the secondary reference node 1008A also has a direct LOS with the non-fixed node 1010A. To increase the confidence levels in a distance measurement, an additional ranging measurement can be taken between the secondary reference node 1008A and the non-fixed node 1010A. Having additional ranging measurements allows the base station 1004 to select a best available combination of ranging measurements corresponding to a best possible position calculation given an established acceptance criteria, which provides the highest possible confidence level of the determined position of the non-fixed node 1010A.

Signal quality measurements can also be used to make a determination of ranging measurement accuracy. It is well known, for example, that as the signal-to-noise ratio (SNR) decreases the determination of a leading edge of a receiving UWB signal becomes more difficult and prone to error. Similarly, a high bit-error-rate may indicate high multipath. In accordance with the invention, a standard deviation of range measurements higher than a threshold combined with a SNR also higher than a threshold indicates a non-LOS situation. Thus, in accordance with the invention, acceptability thresholds can be established for signal quality. Under one arrangement, expected ranging errors are established for a range of SNRs. Metrics may also be established that characterize a multipath environment about a given radio as being in a high multipath environment or being in close proximity to an interferer. If RF environment characterization metrics are employed, different RF signal propagation models can be employed to remove ranging error due to signal propagation being other than the speed of light.

When selecting a best available combination of ranging measurements, the base station 1004 may consider one or more factors such as signal quality metrics (e.g., SNR, bit error rate, etc.), probability density functions, shape and orientation of an error region, acuteness of angles between reference nodes, age of a range measurement, etc. Under one embodiment, the number of error regions compounded is used such that positions having the least amount of error compounding are considered to be better than those having more compounding. The acceptance criteria may include acceptability thresholds and may involve a decision tree (e.g., a flow chart) where the best combination of answers to various questions is sought. In order to better manage network load, the base station 1004 may instruct certain reference nodes to not perform certain ranging measurements with a given non-fixed node. For example, when managing the ranging measurements of the PLS, the base station 1004 may decide a work load of a given reference node is causing it to become a bottleneck and provide instructions for it to not perform a ranging measurement. In this way, a proper balance between speed of the PLS and accuracy can be maintained.

In FIG. 10B, primary reference nodes 1002A-1002C and the secondary reference node 1008A are tracking the non-fixed node 1010B. However in this embodiment, an obstacle 1006 prevents a direct LOS for the primary reference nodes 1002B-1002C and the non-fixed node 1010B. Only primary reference node 1002A and the secondary reference node 1008A have a direct LOS with the non-fixed node 1010B. While a direct LOS does not prevent the primary reference nodes 1002B-1002C from ranging with the non-fixed node 1010B, the accuracy of the timing measurements will be adversely affected as previously described since the leading edges of the received signals would not correspond to direct paths.

To accommodate a non-LOS situation, the current embodiment may instead use the calculated positions of one or more of the other non-fixed nodes as a secondary reference node. In this embodiment, a non-fixed node 1010A is used by the base station 1004 as a secondary reference node to calculate the position of a non-fixed node 1010B. For example, a position of the non-fixed node 1010A, which has LOS to the non-fixed node 1010B, might be selected to calculate the position of non-fixed node 1010B. In such a situation, it is preferable that the position of the non-fixed node 1010A remains constant while the non-fixed node is used as a secondary reference node. In addition to LOS, other characteristics, such as speed, direction, elevation, or speed in changes for any of these, may be used to select among non-fixed nodes that could be used as a secondary reference node.

In FIG. 10C, the primary reference nodes 1002A-1002C and the base station 1004 are tracking the non-fixed nodes 1010A and 1010B. In this embodiment, the angles of the primary reference nodes 1002A-1002C with the non-fixed node 1010B are excessively acute since they are near alignment. However, non-fixed node 1010A is at a location that forms less of an acute angle with the non-fixed node 1010B relative to any of the primary reference nodes 1002A-1002C. Since the primary reference node pairs form relatively acute angles with the non-fixed node 1010B, the non-fixed node 1010A may be used as a secondary reference node to calculate the relative position of the non-fixed node 1010B. Generally, although an error region of a position calculated based upon a position of a non-fixed node (or secondary reference nodes) can be larger than the error region of a position calculated based upon known positions of primary reference nodes due to compounding ranging error (described previously), the larger error region may be more acceptable than a smaller but excessively elongated error region calculated using primary reference nodes having overly acute angles.

By using additional nodes, an error region for a position based on one or more non-fixed nodes and/or secondary reference nodes can be determined and compared to the error region about a position based on a calculation exclusively using primary reference nodes, and the position calculation having the most acceptable error region can be selected. Thus, by collaborating with other nodes, the base station 1004 can maintain one or more determined positions and position accuracy confidence levels. This allows the base station 1004 to select a position of a node with the highest position confidence level. The determined node positions and their corresponding confidence levels may be broadcast by the base station 1004 to the primary, secondary, and non-fixed nodes. Additionally, via collaboration, the calculated and known positions of the various nodes can be compared for consistency, and anomalies between different node distance determinations can be used to identify where a direct path does not exist between two nodes. If confidence of range measurements is low, the base station can request additional secondary reference nodes be placed in certain approximate locations in order to improve reference node geometry, signal strength, etc.

The configurations of primary reference nodes, secondary reference nodes, and non-fixed nodes described previously are provided for exemplary purposes only. Generally, primary reference nodes may be positioned at locations within coverage area such as outside a building or inside a building with spacing between primary reference nodes intended to provide acceptable 'position determination' accuracy over the coverage area. For example, if a coverage area encompasses a shopping mall, primary reference nodes may be positioned within each store inside the mall and at established intervals in common spaces of the mall such that secondary reference nodes are within at least a desired maximum distance from the closest primary reference node(s). Similarly, primary reference nodes may be put on every, for example, third floor within a tall building so as to extend acceptable position determination accuracy to the highest floors. Primary reference nodes may also positioned to accommodate locations that might otherwise not have a LOS (i.e., they would be blocked) due to an obstruction. Thus, the invention can be practiced using a multitude of primary references nodes (e.g, 10's, 100's, etc.) or with as few as one primary reference node, where the invention allows the use of secondary reference nodes in conjunction with available primary reference nodes to determine other node positions within an acceptable level of confidence.

Figure 11A:
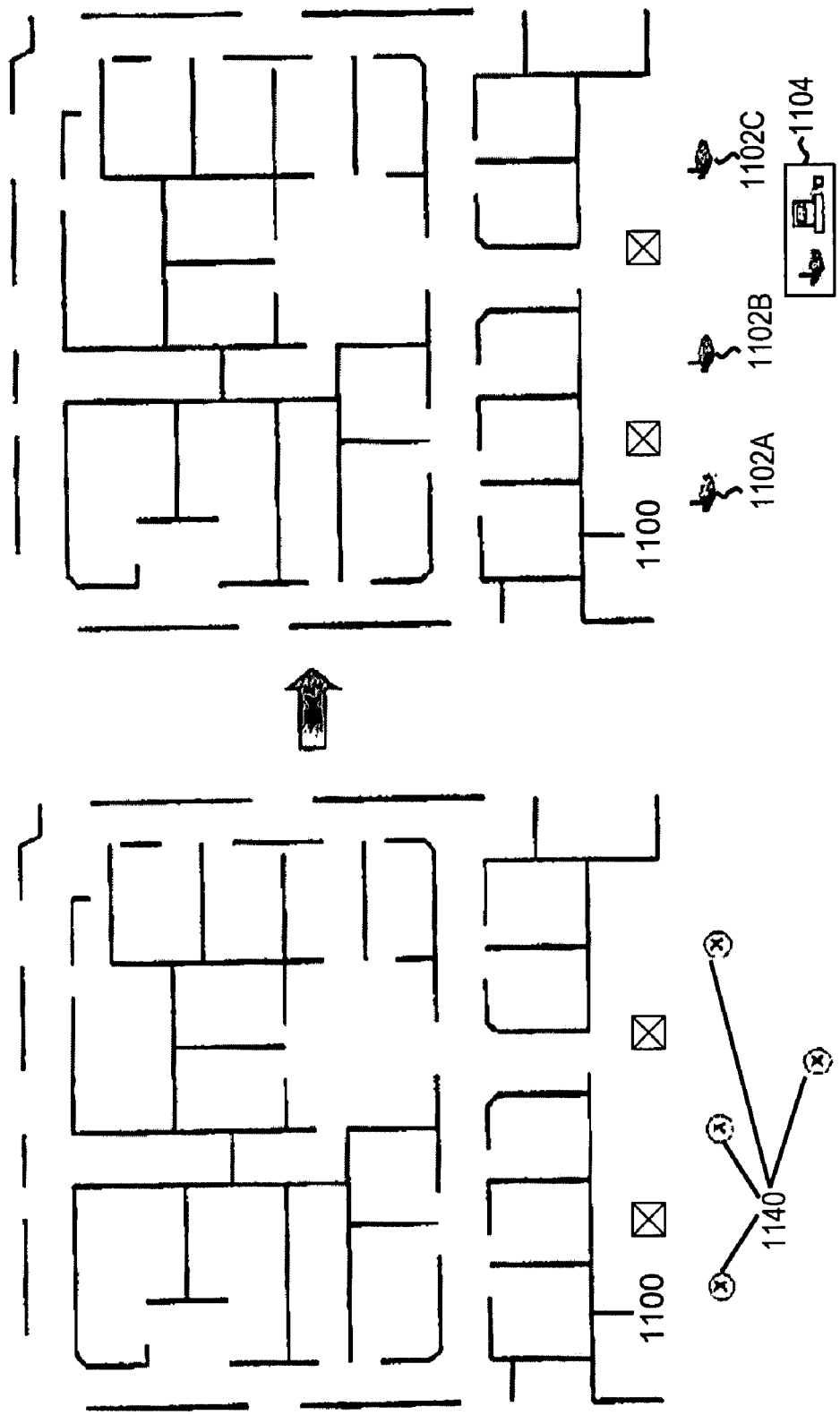
FIGS. 11A-11C illustrate an exemplary embodiment of deploying an extensible PLS according to the present invention.
Figure 11B:
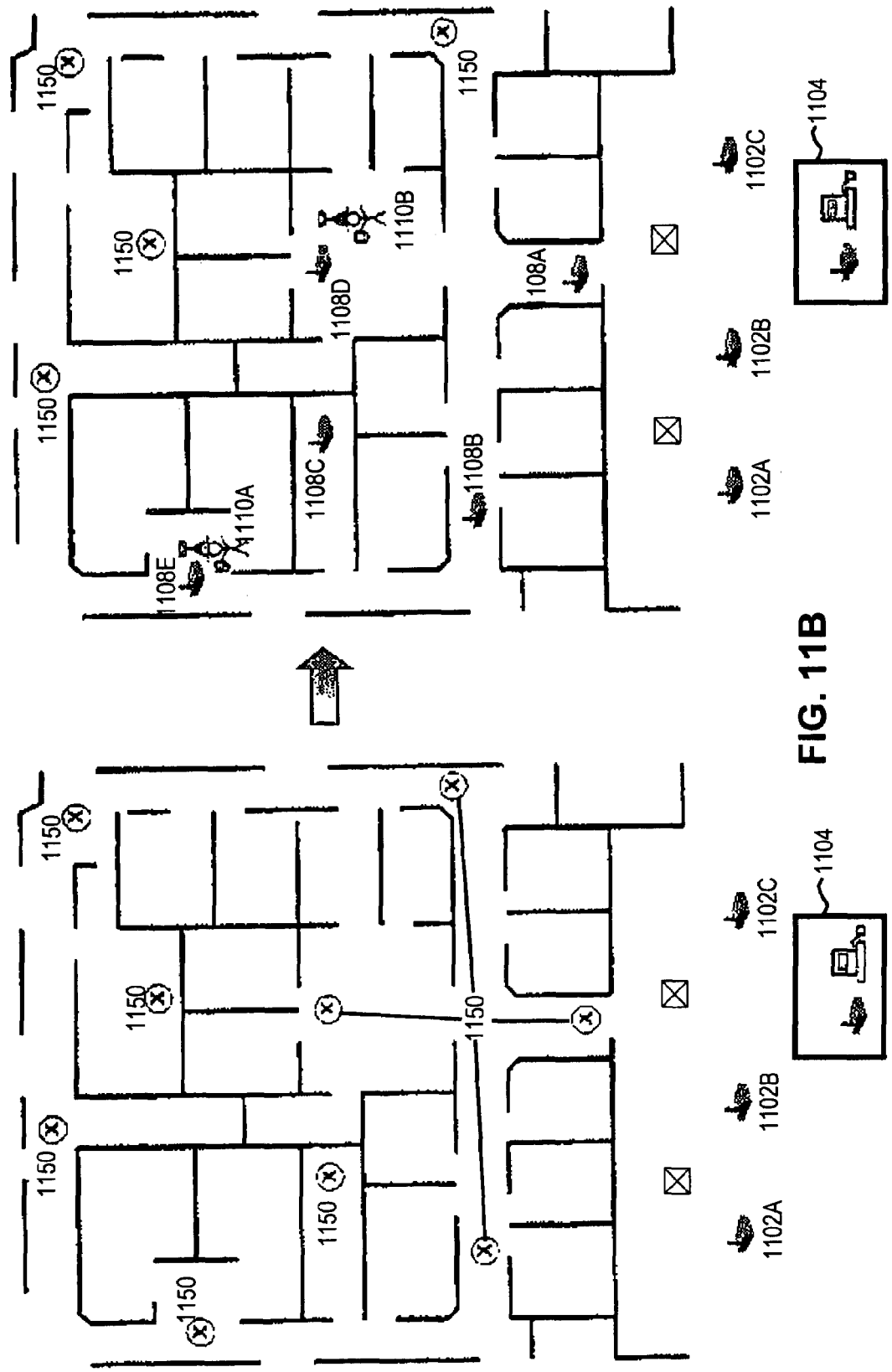
Figure 11C:
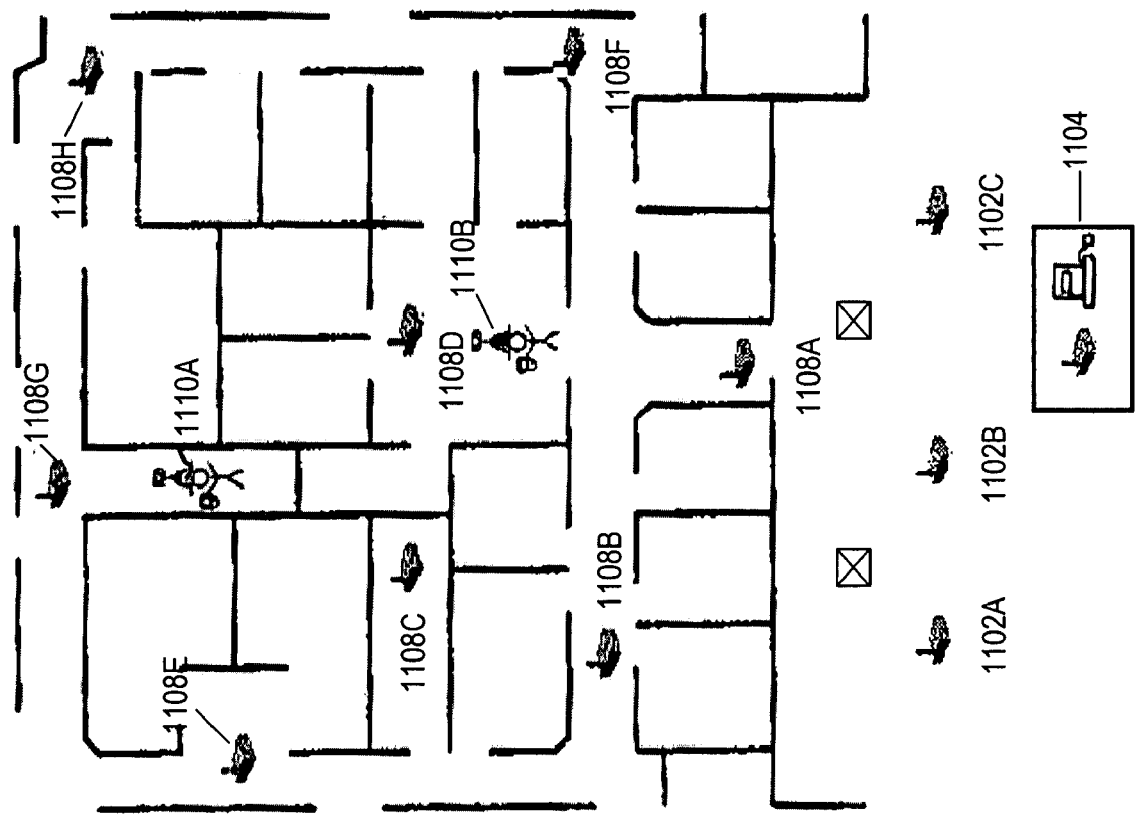

FIGS. 11A-11C illustrate an exemplary embodiment of deploying an extensible PLS according to the present invention. In this embodiment, the extensible and adaptable positioning architecture utilizes UWB radios that are included in non-fixed nodes, primary reference nodes, and secondary reference nodes. FIG. 11A illustrates an exemplary embodiment of initial setup locations for the base station and the primary reference nodes according to the present invention. Initially, unique locations 1140 are selected for deployment of the PLS in and around building 1100. Primary reference nodes 1102A-1102C and a base station 1104 are placed at fixed locations outside of the building 1100, with the primary reference nodes 1102A-1102C being closer to the building 1100 than the base station 1104. It is noted that other locations may be selected for the primary reference nodes 1102A-1102C and the base station 1104, and that the primary reference nodes 1102A-1102C may be placed on different sides of the building 1100, or even within the building 1100.

In this embodiment, the base station 1104 includes a processing device, such as a portable computer, and an UWB radio. The base station 1104 constructs a node map of the base station 1104 and the primary reference nodes 1102A-1102C through the ranging process, as discussed above. The primary reference nodes 1102A-1102C and the base station 1104 form the reference system for positioning and tracking of the secondary reference and non-fixed nodes. As the relative positions between the primary reference nodes 1102A-1102C and base station 1104 are being calculated, users (e.g., emergency responders, firemen, police, soldiers) carrying the non-fixed and secondary reference nodes enter the building 1100 and begin placing the secondary reference nodes. In an alternative embodiment, the non-fixed node may be associated with a moveable remote controlled device (e.g., a robot) that places the secondary reference nodes within the building 1100.

FIG. 11B illustrates an exemplary embodiment of deploying secondary reference nodes and non-fixed nodes within the building 1100 according to the present invention. As a user enters, the user places secondary reference nodes within the building 1100. As illustrated, the secondary reference nodes 1108A-1108E are placed at locations 1150. In this embodiment, two users are shown associated with non-fixed nodes 1010A-1010B, respectively, as they place the secondary reference nodes 1108A-1108E within the building 1100. As the secondary reference nodes 1108A-1108E are positioned and as the non-fixed nodes 1010A-1010B move within the building 1100, the primary reference nodes 1102A-1102C, the secondary reference nodes 1108A-1108E, and the non-fixed nodes 1010A-1010B range with one another to determine their relative distances, as described above. As the nodes determine their relative distances to one another, the relative distances are included in range matrix information that is communicated to the base station 1104 either directly or through the primary reference nodes 1102A-1102C, which the base station 1104 uses to update the node map. It is noted that more or less secondary or non-fixed nodes may be used, and that the secondary reference nodes may be placed at other locations, as is understood by those of skill in the art.

FIG. 11C illustrates an exemplary embodiment of a fully deployed PLS according to the present invention. The base station 1104 has constructed a node map including the base station 1104, the primary reference nodes 1102A-1102C, the secondary reference nodes 1108A-1108H, and the non-fixed nodes 1010A-1010B. The primary reference nodes 1102A-1102C and the secondary reference nodes 1108A-1108H periodically range with the non-fixed nodes 1010A-1010B to determine their relative distances, which ranging updates are forwarded to the base station 1104 to update the node map. The PLS also allows for non-position related communications between the base station 1104 and non-fixed nodes 1010A-1010B, either directly or via reference nodes, which can be used for command and control of personnel actions, status updates, situational alerts, etc.

Figure 12:
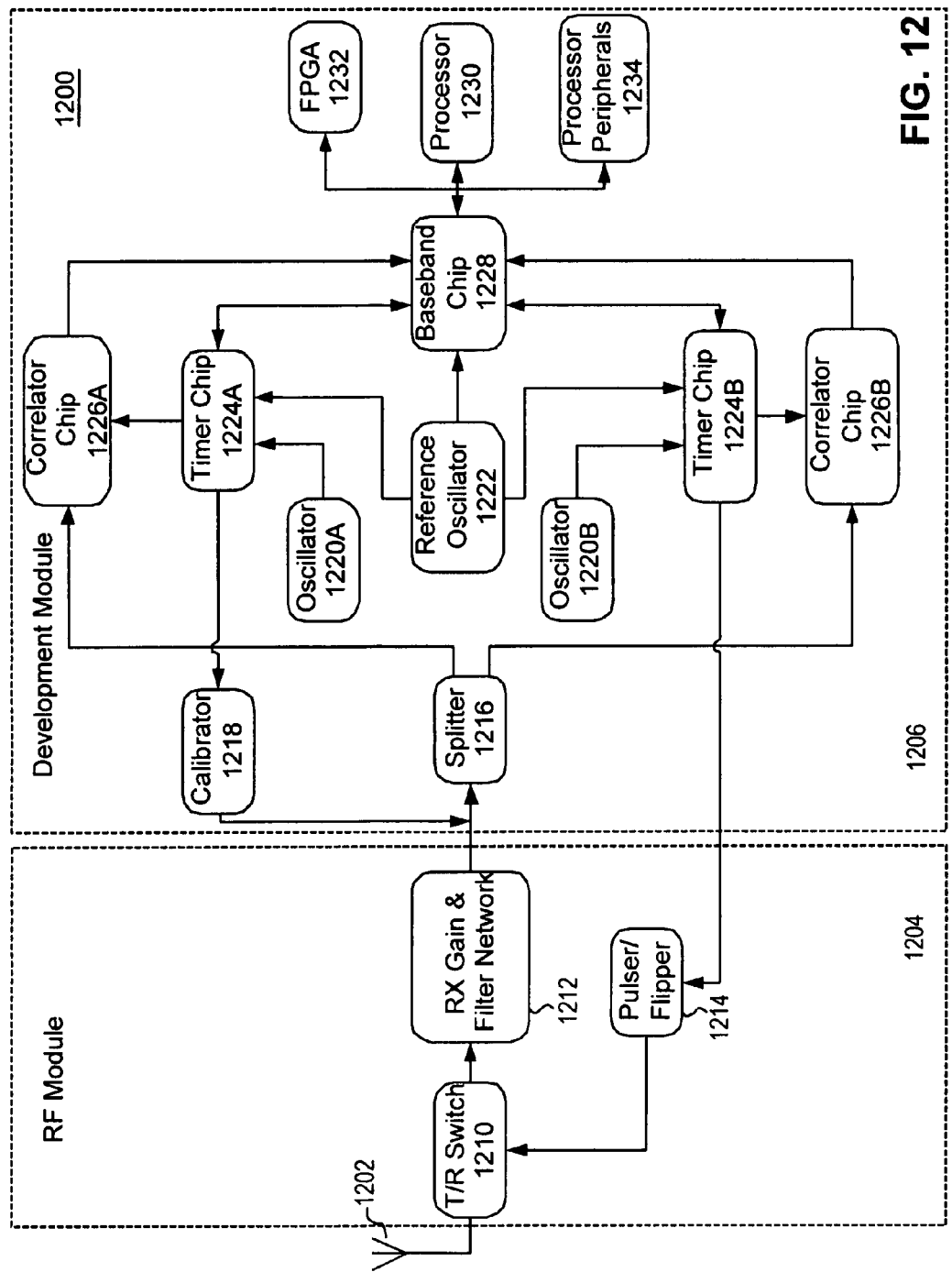
FIG. 12 illustrates an exemplary embodiment of the architecture of an UWB radio included in the base station and the primary, secondary, and non-fixed nodes according to the present invention.

FIG. 12 illustrates an exemplary embodiment of the architecture of an UWB radio included in the base station and the primary, secondary, and non-fixed nodes according to the present invention. In this embodiment, the UWB radio includes an antenna 1202, a RF module 1204, and a Development Module 1206. The antenna 1202 is coupled to a RF module 1204, which is coupled to the Development Module 1206. The RF module 1204 and the Development Module 1206 are mounted within a housing (not shown), which protects the circuit boards and provides mechanical stability. The housing also provides radio frequency (RF) shielding. The antenna assembly 1202 mounts to the outside of the enclosure and connects to the RF input of the RF module 1204.

The RF module 1204 includes a transmit/receive (T/R) switch 1210, a RX Gain & Filter Network 1212, and a Pulser/Flipper 1214. The T/R switch 1210 is adapted to route RF signals (i.e., control whether signals are transmitted or received by the antenna), the RX Gain & Filter Network 1212 is adapted to reject interference and to provide gain control to the signal delivered to the Development Module 1206, and the Pulser/Flipper 1214 is adapted to generate pulses and selectively invert generated pulses thereby allowing pulse-by-pulse control of the polarity of each transmitted pulse. Alternatively, separate transit and receive antennas could be employed instead of a single antenna and a T/R switch.

To transmit data, Baseband Chip 1228 passes data it receives from processor 1230, FPGA 1232, and/or Processor Peripherals 1234 to the Timer chip 1224B. Timer chip 1224B is adapted to generate ultra-precise timing triggers that enable time-hopped modulation. The Timer chip 1224B is clocked by the Reference Oscillator 1222, which also clocks the Baseband chip 1228. A signal is then sent to the Pulser/Flipper 1214 that outputs appropriately timed pulses and inverted pulses representing the data that are passed to the T/R Switch 1210 and output to antenna 1202.

When receiving a signal from antenna 1202, T/R switch 1210 routes the received signal to RX Gain & Filter Network device 1212 where it is appropriately amplified and filtered. The amplified/filtered signal is then output to Splitter 1216. At the output of Splitter 1216, the signal is split and transferred to Correlator Chips 1226A-1226B, which receive timing triggers from Timer Chips 1224A-1224B, respectively. The Timer chips 1224A-1224B are clocked by the Reference Oscillator 1222, which is the primary oscillator for the system and is used as a phase-lock reference for oscillators 1220A-B. A signal is also sent by Timer Chip 1224A to the Calibrator 1218 to calibrate the incoming signal from the RX Gain & Filter Network device 1212. The Correlator chip 1226 converts the RF signal to a baseband signal that can be sampled by the Baseband Chip 1228. The Correlator chips 1226A-1226B are shielded to minimize interference to the correlator circuits. The Baseband chip 1228 is a CMOS logic and multi-ADC (i.e., analog to digital converter) chip responsible for acquisition, modulation, tracking and scanning functions of the radio. From the Baseband chip 1228, the data is transferred to the processor 1230. The processor 1230, along with the Field-Programmable Gate Arrays (FPGA) 1232 and the processor Peripherals 1234 configures the Baseband chip 1228. The processor 1230 also controls and monitors the state of the radio during operation and manages data input/output (I/O) to the user.

Figure 13:
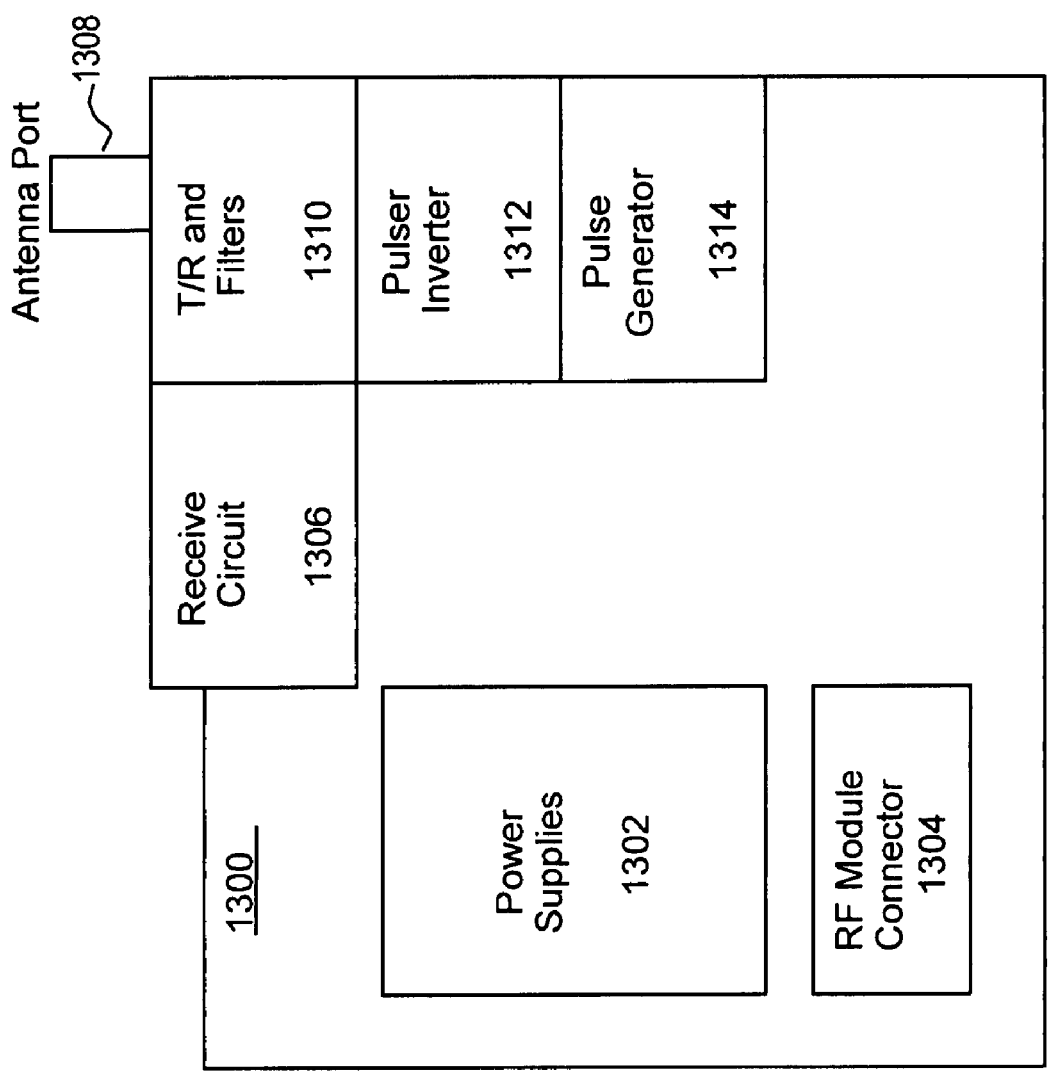
FIG. 13 illustrates an exemplary embodiment of a layout of a RF module of an UWB radio according to the present invention.

FIG. 13 illustrates an exemplary embodiment of a layout of RF module 1300 of an UWB radio according to the present invention. Included in RF module 1300 are the Power Supplies 1302, RF Module Connector 1304, Receive Circuit 1306, Antenna Port 1308, T/R Switch and Filters 1310, Pulser Inverter 1312, and Pulse Generator 1314. Because the functionality of the various components in FIG. 13 was described in relation to FIG. 12 or would otherwise be well known by one of ordinary skill in the art, additional description of the RF module layout is not provided.

Figure 14:
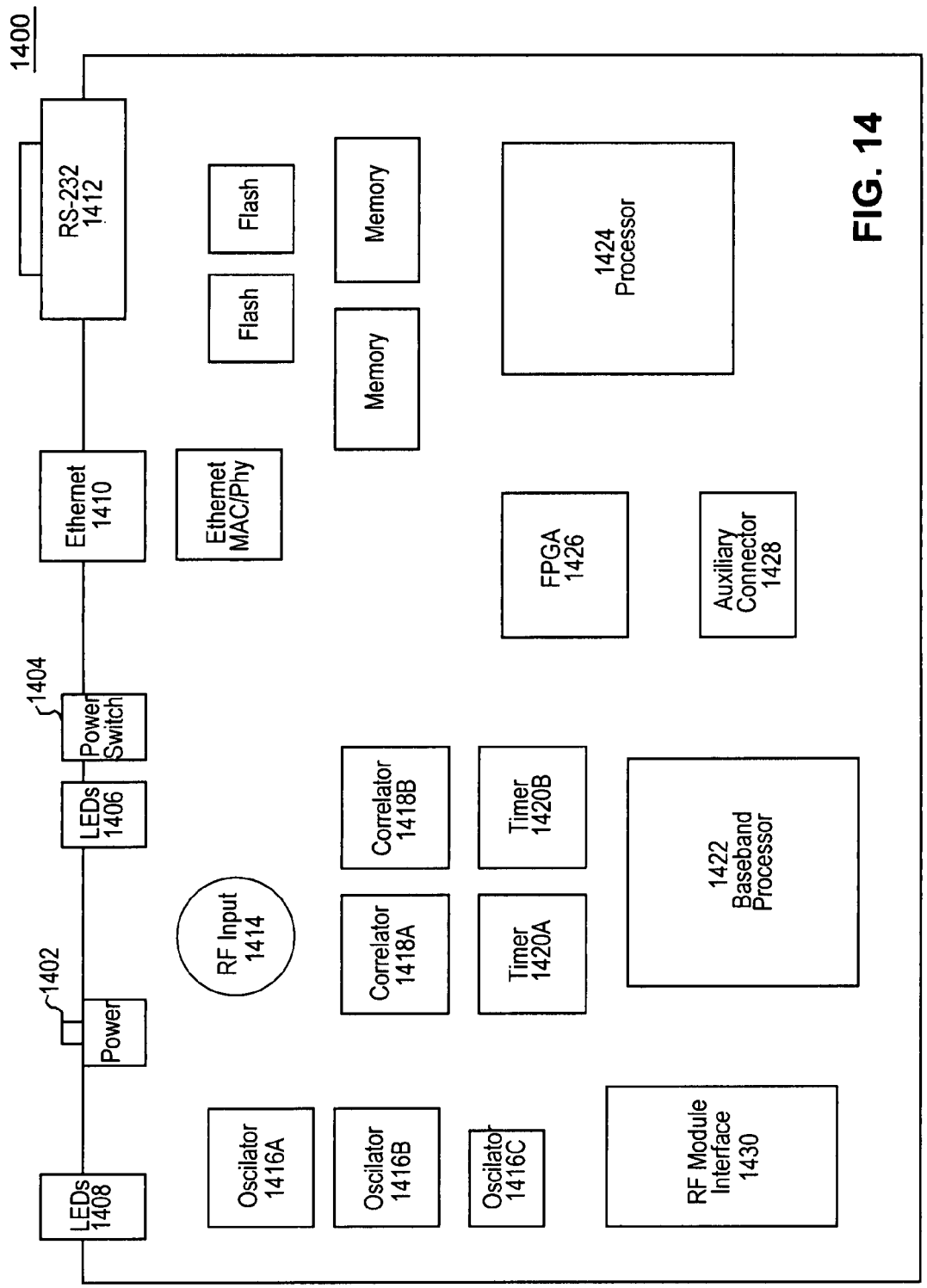
FIG. 14 illustrates an exemplary embodiment of a layout of a development module of an UWB radio according to the present invention.

FIG. 14 illustrates an exemplary embodiment of a layout of the development module component of an UWB radio according to the present invention. Included in the development module component 1400 are the Power Input 1402, the Power Switch 1404, LEDs 1406 and 1408, an Ethernet connection 1410, a RS-232 Input 1412, an RF Input 1414, Oscillators 1416A-C, Correlators 1418A-B, Timers 1420A-B, a Baseband Processor 1422, a Processor 1424, a FPGA 1426, an Auxiliary Connector 1428, a RF Module Interface 1430. Also included in the Development module component 1400 is an Ethernet MAC/PHY Interface, Flash storage and Memory. Because the functionality of the various components in FIG. 14 was described in relation to FIG. 12 or would otherwise be well known by one of ordinary skill in the art, additional description of the development module layout is not provided.

Figure 15:
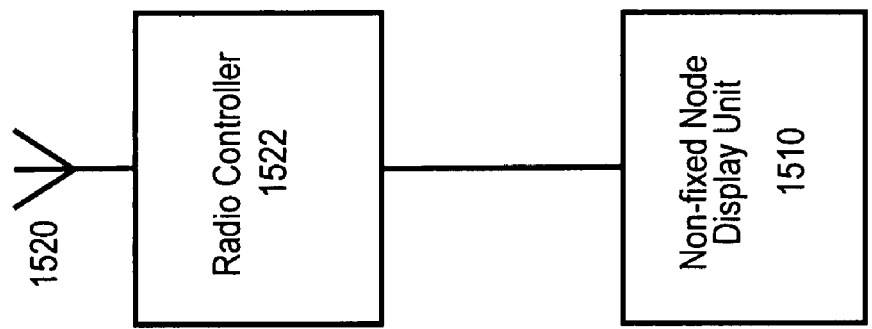
FIG. 15 illustrates an exemplary embodiment of a top-level system software architecture of the PLS according to the invention.
Figure 15:
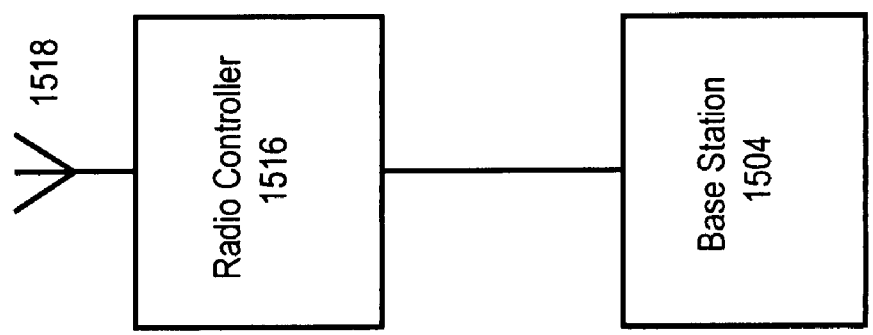

FIG. 15 illustrates an exemplary embodiment of a top-level system software architecture of the PLS according to the present invention. As shown, a base station application 1504 is connected to a radio controller application 1516 to exchange data with the radio controller application 1516 over a data network, such as Ethernet. Attached to the radio controller application 1516 is an antenna 1518 for communicating with a non-fixed node display application 1510. An antenna 1520 receives a signal transmitted by the base station application 1504 and passes the signal to a second radio controller application 1522. The second radio controller application 1522 passes information to the non-fixed node display application 1510.

In this embodiment, the PLS consists of three different applications; the base station application, the non-fixed display unit application, and the radio controller application. The Base Station application provides a real-time display of node positions to users at the base station. The non-fixed display application provides a user with a 2-D (or 3-D) display of each non-fixed node relative to one another. The Radio Controller performs ranging between nodes and propagates distance and position information through the network. These applications will be discussed in FIGS. 16-19 below.

Figure 16:
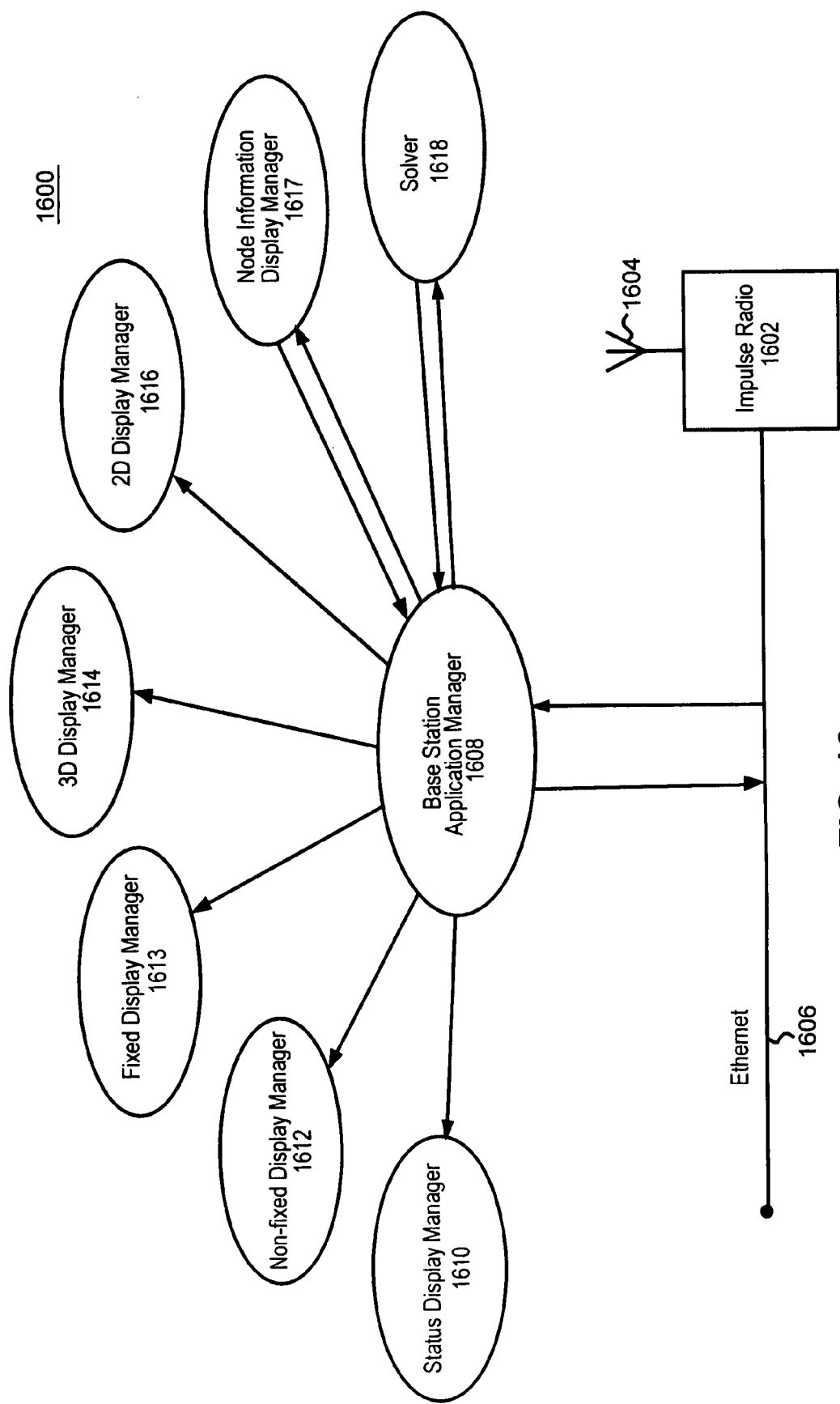
FIG. 16 illustrates an exemplary embodiment of a base station application architecture according to the present invention.

FIG. 16 illustrates an exemplary embodiment of a base station application architecture according to the present invention. The Base Station application architecture 1600 is software and/or hardware included at the base station. The Base Station application 1504 may be executed on a laptop computer due to size and portability considerations, but may also be implemented using other computing devices.

The Base Station Application 1600 architecture includes a Base Station Application Manager 1608 residing on a computing device having an interface to a network 1606 to which a UWB radio 1602 is connected. UWB radio transmits and receives UWB signals via antenna 1604. The network 1606 may be an Ethernet network and may transport UDP packets. As such, the network connects the UWB radio and the computing device upon which the Base Station Application 1600 resides. Coupled to the Base Station Application Manager 1608 are a Status Display Manager 1610, a Non-fixed Node Display Manager 1612, a Fixed Node Display Manager 1613, a 3-D Display Manager 1614, a 2-D Display Manager 1616, a Node Information Display Manager 1617, and a Solver 1618.

In the present embodiment, the Base Station Application Manager 1608 handles and stores all of the critical application data for tracking the location of primary, secondary, and non-fixed nodes. The Base Station Application Manager 1608 also manages all critical event driven processes of the PLS. The Base Station Application Manager 1608 processes data communicated from the UWB radio 1604 over the Ethernet 1606, such as data packets including alerts and ranges. In one embodiment, the data packets are UDP database packets. The Base Station Application Manager 1608 processes the alerts to modify an internal data storage of the base station. Internal data storage stores the software used by the base station and stores range matrix information on the nodes.

The Base Station Application Manager 1608 also provides user interface functionality. The Base Station Application Manager 1608 includes software for User Interface Processing to respond to inputs received from the user interface, such as displaying a dialog "pop-up" in response to a user requesting information on a particular node. A user may view the particular node by selecting an icon representing the particular node within a GUI via, for example, double-clicking on the icon.

The Base Station Application Manager 1608 also communicates with a 2-D display manager 1616. The 2-D Display Manager 1616 manages the display and user interaction of a two-dimensional map view window of the GUI. The 2-D Display Manager 1616 displays a two-dimensional user-defined grid, and user-defined icons that represent the nodes in their relative two-dimensional positions. The 2-D Display Manager 1616 also displays other graphic interface objects, such as alert status icons, operational status icons, or the like. The 2-D Display Manager 1616 processes user events (e.g., zooming, panning, double-clicking, etc.) relative to the GUI.

The 3-D Display Manager 1614 communicates with the Base Station Application Manager 1608, and manages the display and user interaction of the three-dimensional map view window of the GUI. The 3-D Display Manager 1614 displays a three-dimensional user-defined grid, the user-defined objects in their correct three-dimensional positions, as well as other graphic interface objects using a software, such as, for example, openGL. The 3-D Display Manager 1614 processes the user events relative to the display window, such as zooming, panning, double-clicking, etc. In an alternative embodiment, the 3-D Display Manager 1614 and the 2-D Display Manager 1616 may be incorporated into a single display manager that can manage the display and user interaction of a two- and/or three-dimensional node map.

The Base Station Application Manager 1608 also communicates with a Node Information Display Manager 1617. The Node Information Display Manager 1617 manages a pop-up dialog box containing detailed information concerning a selected node. The detailed information includes unit ID, name, node ID, position, operational status, alert status, order status, and icon descriptor.

The Non-fixed Node Display Manager 1612 communicates with the Base Station Application Manager 1608, and manages the non-fixed node list view window of the GUI, which is a text listing of each non-fixed node and text data relative to the non-fixed node. The text listing of each non-fixed node and text data includes a name, node ID, alert status and operational status.

The Fixed Node Display Manager 1613 communicates with the Base Station Application Manager 1608, and manages the fixed node list view window of the GUI, which is a text listing of each fixed node and text data relative to the fixed node. The text listing of each fixed node and text data includes a node ID, operational status, an indication of whether a primary or secondary reference node, time since last communication, and time since last position update. It is noted that the time since last position text data for primary reference nodes does change because their positions do not change.

The Status Display Manager 1610 manages a status list view window within the GUI. The status list view is a list of text messages that display event information about the application as it happens. The status display manager maintains a scrollable history of the list of text messages.

Figure 17:
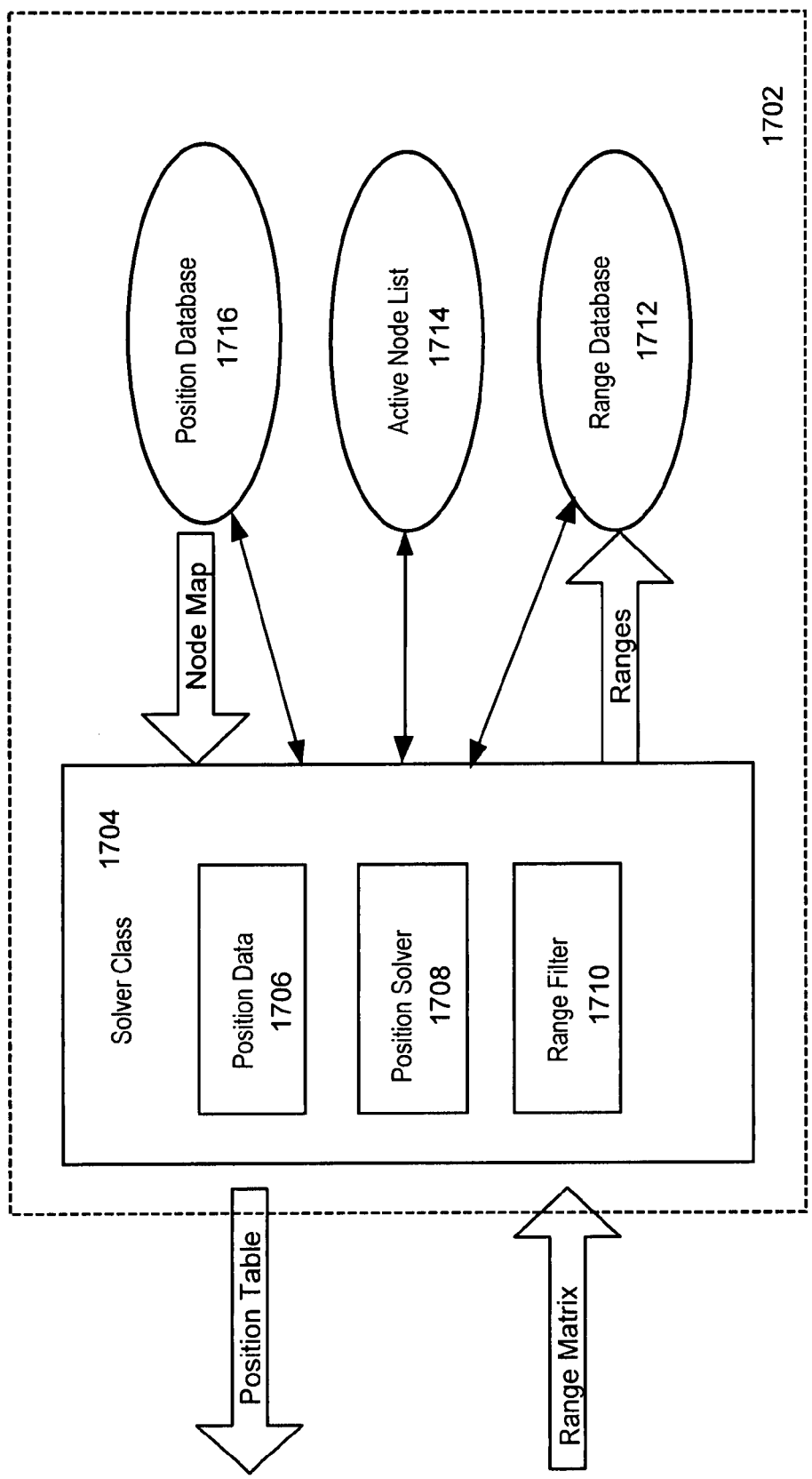
FIG. 17 illustrates an exemplary embodiment of the solver according to the present invention.

FIG. 17 illustrates an exemplary embodiment of the solver 1618 according to the present invention. The Solver 1618 is a application-independent module that is reusable across different tracking systems. The Solver 1618 calculates the relative positions of the primary, secondary, and non-fixed nodes based upon range matrix information received from the Base Station Application Manager 1608 during the ranging process. The Solver 1618 uses triangularization to calculate the positions of the primary, secondary, and non-fixed nodes within the PLS using the range matrix information, as described above. The Solver 1618 also responds to position update requests from the Base Station Application Manager 1608, and updates internal data storage with the position table updates.

As described below, the solver may filter ranging information to remove 'ranging noise'. Ranging noise can be described as the underlying variations in the ranging system that would cause variations in measurements over time as might be caused by temperature variations, interference, etc. Typically, if 100 measurements are taken, the measurements will not all be the same and instead there will be an average measurement, standard deviation, etc. Such variations in the same measurement over time are referred to here as ranging noise. Another type of ranging noise within the PLS occurs as a function of range measurements to a non-fixed node being taken at different times. This type of ranging noise comes into play whenever a non-fixed node is moving. Accordingly, when needed as a secondary reference, a non-fixed node is requested to remain in a fixed location to remove this type of ranging noise.

The architecture of the Solver 1618 includes a Solver Class 1704, a range database 1712, an Active Reference/Device List 1714, and a Position Database 1716. The Solver Class 1704 interacts with the Range Database 1712, the Active Node List 1714, and the Position Database 1712. Within the Solver Class 1704 is a Position Filter 1706, a Position Solver 1708, and a Range Filter 1710.

The Range Filter 1710 processes range matrix information received from the Application Manager 1608 based on various factors, such as signal quality measurements on a communications link between a node pair, bit error rates, traveling speed of the nodes, and other additional information (if available) on the node pair. The Range Filter 1710 calculates acceptable range boundaries for the node pairs in accordance with an established node speed limit and noise measurements. The Range Filter 1710 then compares the range boundaries with the various factors and with noise measurements on link quality. If the incoming range matrix information is outside of the range boundaries, the Range Filter 1710 replaces the incoming range matrix information with a previously stored range matrix information, thereby filtering (or removing) range matrix information outside of the acceptable range boundaries. Instead of rejection range values, the range filter may modify range values using different filtering techniques (e.g., extrapolation, interpolation, Kalman filtering) to correct erroneous range and align ranges taken at different points in time. When the range matrix information is outside of the range boundaries, the Position Solver 1708 of the Solver 1618 retrieves a range history from the Range Database 1712. The previous range matrix information may be based on the range history for the node. The range history may be a single position calculation, an average position calculation, a statistical position calculation, or a position prediction based on range matrix information received previously and stored in a Range database 1712 for the node.

The Position Solver 1708 uses the range history to calculate node position based on the range history of the node and any current distance information in the range matrix that is within the range boundary. Typically, the Position Solver 1708 first uses the current range matrix information in the position calculation. If the data is within the range boundary, the Position Solver 1708 performs the position calculation. However, the Position Solver 1708 may also use the range history to supplement the current range matrix in the position calculation. If sufficient range information is available by combining the range history and the current range matrix, a node position is calculated. If range information is insufficient even when using the range history, the Position Solver 1708 may return duplicate solutions. Typically, the range information is insufficient when an insufficient number of nodes are tracking a node (i.e. less than two nodes), which causes duplicate solutions of possible positions for a node. When this occurs, the Position Solver 1708 assigns a probability to each of the possible positions and stores each of the positions with the respective probabilities in the Position Database 1716. The probability is assigned to the possible locations based on information in the range history, and/or on a predicted location.

Once all of the node positions are calculated, then the Position Solver 1708 develops a node map containing the relative positions of the nodes. The Position Solver 1708 then communicates the node map to the Position Database 1716, which stores the current node map along with previous node maps. After the Position Database 1716 receives the updated node map, the Position Database 1716 may signal the Position Filter 1706 about the updated node map. The Position Filter 1706 may then request to receive the updated node map from the Position Database 1716. Once the Position Filter 1706 receives the updated node map, the Position Filter 1706 sorts duplicate positions in the node map based on the position history. In cases where no single solution exists for the position of the node, the Solver Class 1704 may query the user to enter a position guess for the node to help with the decision. Once the duplicate positions are sorted, the Position Filter 1706 places the node map in a position table, which may be forwarded to the nodes.

Also interfacing with the Position Solver 1708 is the Active Node List 1714. The Active Node List 1714 contains node identifications (IDs) that distinguish between individual nodes and node types (e.g. primary, secondary, non-fixed) in the PLS. The node types of the Active Node list 1714 identify if a node is stationary, moving slowly, or moving quickly. The Active Node list maybe initially established by a user. In one embodiment, the Active Node List remains constant while in another embodiment nodes may be added, deleted and/or their information modified in accordance with an established protocol.

When the Base Station Application starts, the Solver 1618 uses an auto-survey technique to determine the positions of the base station relative to the primary reference nodes, which have known locations relative to a reference point. The reference point may be a building or other structure that established a coordinate system. The coordinate system thus relates positions of the base station and the primary reference nodes to the reference point. In one embodiment, a user is given rotational controls at the user interface to rotate the screen so that it corresponds with the relative positions. In an alternative embodiment, the system may auto-survey using known positions of fixed points that are entered into the base station, and the base station determines its position relative to the fixed points. The fixed points may be determined by, for example, a global positioning system.

Once the Solver 1700 has completed the auto-survey technique, the Solver 1618 periodically receives range matrix information from the Base Station Application 1600. In response, the Solver 1618 calculates a node map from the range matrix information, and communicates the node map to the Base Station Application Manager 1608 in the form of a position table. The Base Station Application Manager 1608 then communicates node map to the 2-D Display Manager 1616 or the 3-D Display Manager 1614 for display at the user interface. The base station application also forwards the position table (node map) to the UWB radio 1602, which broadcasts the position table to the other nodes in the network. The non-fixed nodes receive the position table and use it to update their displays.

Figure 18:
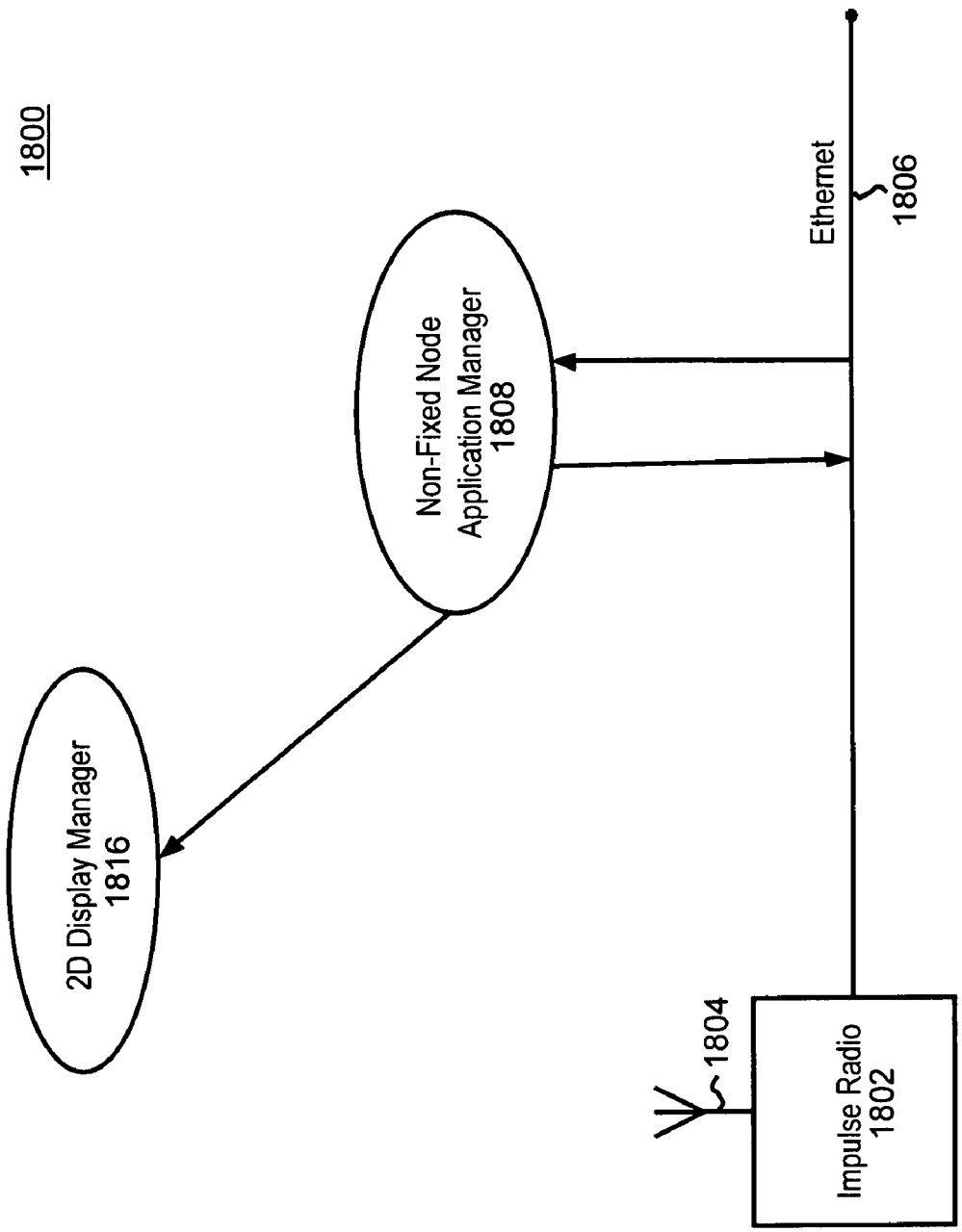
FIG. 18 illustrates an exemplary embodiment of a non-fixed node display application architecture of a non-fixed node according to the present invention.

FIG. 18 illustrates an exemplary embodiment of a Non-fixed Node Application 1800 architecture of a non-fixed node according to the present invention. The Non-fixed Node Application 1800 architecture is similar to the Base Station Application 1600 architecture. However, the Non-fixed Node Application generally does not include the solver 1618. Typically, the Non-fixed Node Application 1800 is used to display the positions of the nodes received from the base station. In an alternative embodiment, the Non-fixed Node Display Application includes a solver 1618 for determining its position relative to other nodes.

The Non-fixed Node Application 1800 provides a user of a non-fixed node with a 2-D display of the relative positions of each primary, secondary, and non-fixed node's position. As shown, the Non-fixed Node Application 1800 architecture includes an UWB radio 1802 equipped with an antenna 1804. The UWB radio 1802 is attached to an Ethernet network 1806 for connection to a Non-fixed Node Application Manager 1808. The Non-fixed Node Application Manager 1808 is coupled to a 2-D Display Manager 1816. The Non-fixed Node Application 1800 architecture may include a GUI similar to the GUI of the Base Station Application 1600, described above, including a 3-D display, status list view window, etc. if desired. In one embodiment, the Non-fixed Node Application 1800 executes on a Windows™ CE-based handheld computer.

The Non-fixed Node Application Manager 1808 of the Non-fixed Node Application 1800 architecture handles and stores all critical application data and all critical event driven processes. The Non-fixed Node Application Manager 1808 processes the critical application data received from the Ethernet 1806, which may be data packets, such as, for example, UDP database packets, received on positions or on alerts form the base station. The Non-fixed Node Application Manager 1808 processes the alerts to modify internal data storage and notify the non-fixed node if an assist alert or an evacuation has been ordered received from the base station. Critical event driven processes include an assist message and an evacuation message. The Non-fixed Node Application Manager 1808 also performs user interface functions based upon user interface driven events such as a MAYDAY alert event which may result in a non-fixed device vibrating, flashing a light, emitting a sound, or any combination of these.

Coupled to the Non-fixed Node Application Manager 1808 is the 2-D Display Manager 1816. The 2-D Display Manager 1816 handles the display and user interaction in a map view window. The map view window is a display of the user-defined grid and the user defined icons. In the map view window, the user-defined icons are placed at locations that correspond to the relative positions of the base station and each of the nodes. The user-defined icons may also display node ID information, a two dimensional coordinate position of the node (x, y), speed of the node, or any other information on the user of the node or its movement characteristics. The 2-D Display Manager 1816 also processes user events relative to the display window, including zooming, panning, etc. In an alternative embodiment, a 3-D Display Manager may be used to display a three dimensional representation of the nodes.

At startup, the 2-D Display Application is adapted to receive a position table from a primary reference node at the attached UWB radio 1802. The 2-D Display Application periodically receives updates of the position table from the UWB radio via the Non-fixed Node Application Manager 1808. The 2-D Display Application also receives and displays alerts from the base station, and broadcasts alerts from the user (e.g., a firefighter).

Figure 19:
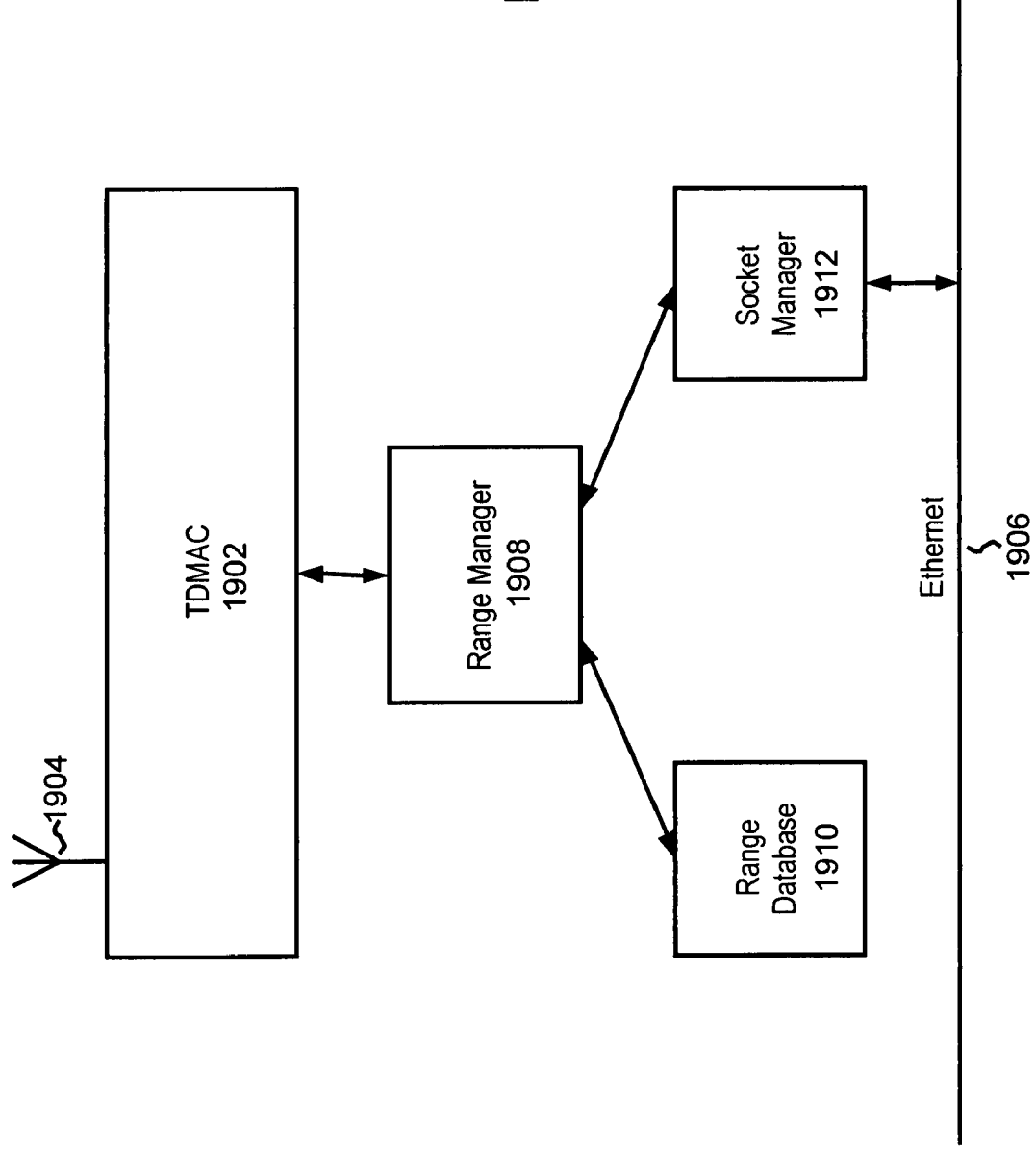
FIG. 19 illustrates an exemplary embodiment of a radio controller application according to the present invention.

FIG. 19 illustrates an exemplary embodiment of a radio controller application according to the present invention. The radio controller application performs ranging between nodes and propagates range and position information throughout the PLS. The radio controller application is an embedded application that executes on each node in the PLS network. Primary reference nodes, secondary reference nodes and non-fixed nodes all may run the same radio controller application.

The radio controller architecture includes a range manager 1908, a range database 1910, a socket manager 1912, a Time Division Media Access Controller (TDMAC) 1902, and an antenna 1904. The range manager 1908 is a control system that decides which nodes to range with and responds to range requests from other nodes. The range manager 1908 selects a node to range with based on a number of criteria, including signal strength, link quality, bit error rate, or other known signal quality parameters. The range manager 1908 also merges range matrices received from other nodes into the range database 1910, and routes data between the socket manager 1912 and the TDMAC 1902.

The range database 1910 is a table of the most current ranges known to a node in the range matrix. Each range has an age defined by a time stamp and older ranges are replaced by updated range matrix information when it is received.

Coupled to the Socket Manager 1912 is a connection to an Ethernet 1906. The socket manager 1912 manages Ethernet traffic over a UDP socket. The socket manager 1912 receives the position table from the Base Station, and transmits a range matrix to the base station.

The present embodiment may support a variety of air-time scheduling methods, including Time Division Multiple Access (TDMA) and Carrier Sense Multiple Access (CSMA). Generally, any air-time scheduling method that allocates a given time slot, frequency slot, or code to a given node may be used. In this embodiment, the radio controller architecture 1900 includes a Time Domain Medium Access Controller (TDMAC) 1902 attached to an antenna 1904. The TDMAC 1902 interfaces with the Range manager 1908, and coordinates the access of all nodes to a wireless medium using air-time scheduling methods. The TDMAC supports several means of providing access to the wireless medium. In one embodiment, the PLS uses a TDMA scheme. The TDMA scheme divides air time into frames (also called time slots) and aggregates frames into superframes. Each radio is allocated a pre-defined time slot for transmitting data. Each time slot is large enough to accommodate both packets in a ranging sequence (a request packet followed by a response packet). The superframe is large enough to contain one time slot for each radio in the network.

In an alternative embodiment, a CSMA controller may be used. The CSMA controller detects whether any other nodes are transmitting, and if they are, the CSMA controller waits a random amount of time, and then detects whether any other nodes are transmitting. If no other nodes are transmitting, the CSMA controller allows the node to transmit. Otherwise, the CSMA controller waits another random amount of time.

Figure 20A:
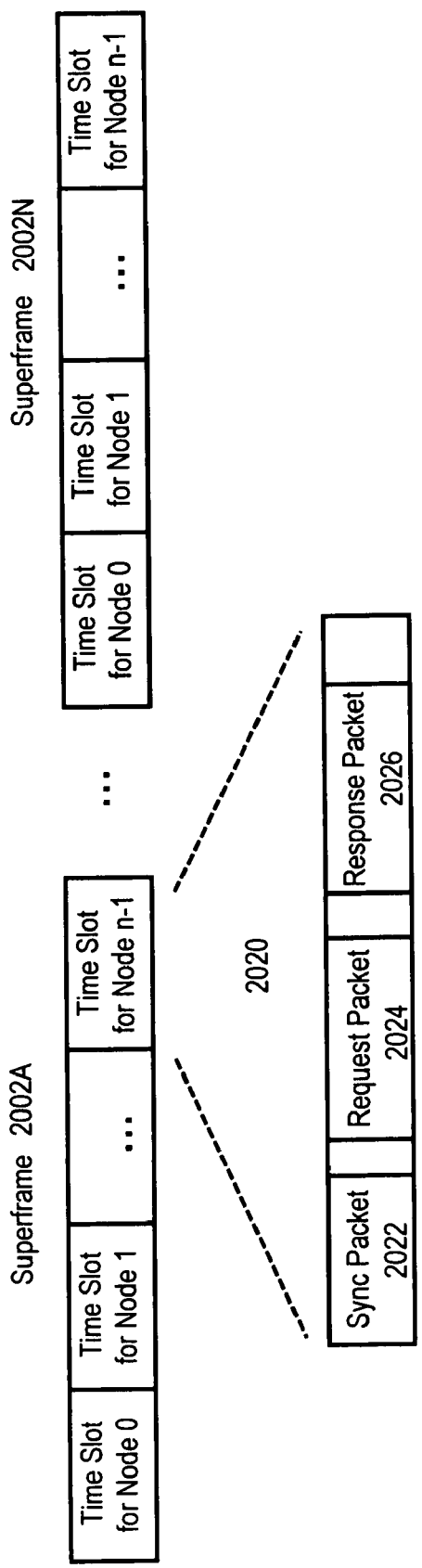
FIG. 20A illustrates an exemplary embodiment of a time division multiple access superframe and time slot according to the present invention.

FIG. 20A illustrates an exemplary embodiment of a time division multiple access (TDMA) superframe and time slot according to the present invention. Each superframe 2002A-N contains 'n' times slots corresponding to the 'n' nodes, where time slot 0 is occupied by Node 0. The time slots may correspond to the node IDs. As shown, the Time Slot for Node n−1 includes a number of smaller time slots 2020. The time slot 2020 includes a Sync Packet 2022, a Request Packet 2024 and a Response Packet 2026. Time slot 2020 is an exemplary embodiment of range matrix information in the PLS network.

At startup, the TDMAC 1902 of each node is configured with its own unique time slot in the superframe 2002. In an alternative embodiment, the base station may assign each node a time slot. At the beginning of the time slot for each node, the range manager 1908 of each node selects another node to range with based on the length of time between the last ranging measurement with that node. The range manager 1908 of the node transmits a range request packet 2024 when desiring to range with a particular node, and receives a range response packet 2026 from that particular node. Based on the transmitted and received packets, the radio calculates the distance to the other node based on information in the response packet.

In the PLS, each node listens to all of the time slots in each superframe 2002. In one embodiment, each node listens in the range request packet 2024 time slot for their node ID. If the range request 2024 includes their node ID, the receiving node transmits a range response packet 2026 that includes a node ID of the transmitting node that sent the range request packet 2024. After receiving their node ID in the range request packet 2024, the receiving node extracts the range matrix 2056 and the position table 2058 from the range request packet 2024. The receiving node uses the range matrix 2056 and the position table 2058 to update its range database 1910, and then transmits the updated range matrix 2056 and position table 2058 out a UDP socket to be broadcast to other nodes.

Figure 20B:
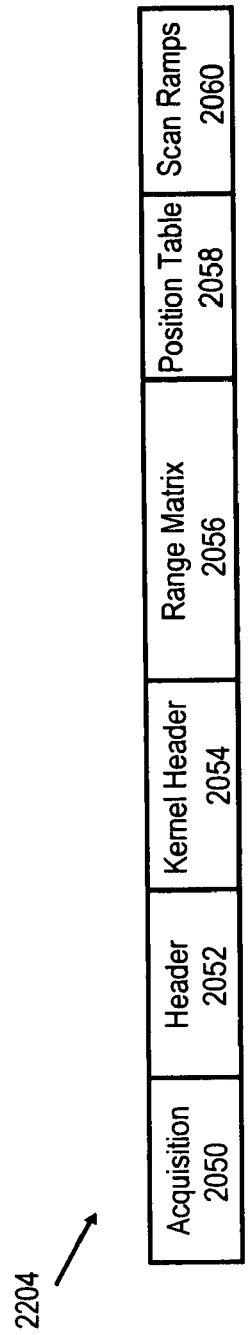
FIG. 20B illustrates an exemplary embodiment of the range request packet 2024 according to the present invention.

FIG. 20B illustrates an exemplary embodiment of the range request packet 2024 according to the present invention. Included in each range request packet 2024 is a location for acquisition part 2050, a header 2052, a kernel header 2054, a range matrix 2056, a position table 2058, and multiple scan ramps 2060 in the ranging process. The acquisition part 2050 is a known data pattern that can be searched for and synchronized with to acquire the request packet. The header 2052 and the kernel header 2054 are used to define the structure of the remainder of the data within the packet. The range matrix 2056 contains all ranges to other nodes known to the transmitting node and their respective node IDs. The Position Table 2058 includes the latest version of the node map transmitted from the base station. The multiple scan ramps 2060 allow for signal quality comparison over time.

As an alternative to the centralized position solver approach described previously, a distributed solver approach can be employed where individual nodes determine their own position. Under this arrangement, individual nodes initiate ranging with reference nodes about them and, after ranging with those nodes, use ranges measured to those nodes to determine their own position, which is then communicated to the other nodes via the position table. Under this arrangement, range matrix information does not have to be shared among nodes. Furthermore, a node can transmit a single 'multiple ranging request packet' that includes a list of those nodes to which it requests a range measurement. Upon receiving the multiple ranging request packet, each node included in the list can provide an acknowledgement message to the requesting node after a predefined delay corresponding to its position in the list. The requesting node can accordingly subtract the corresponding delays from the ranging measurements to the requested nodes to determine the times of flight and corresponding ranges to the nodes.

Figure 21:
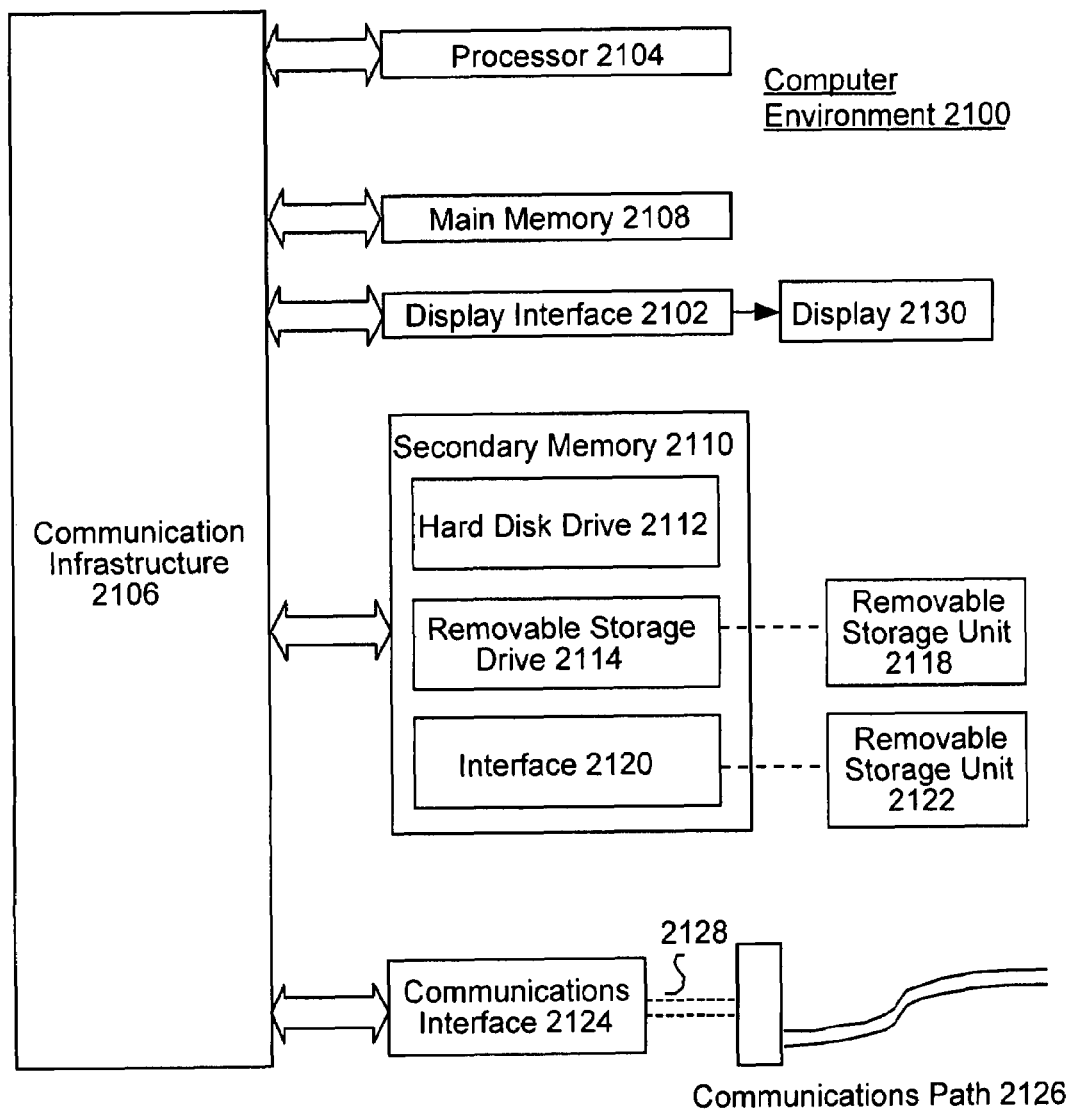
FIG. 21 illustrates an exemplary embodiment of a computing environment 2100 for the PLS according to the present invention.

FIG. 21 illustrates an exemplary embodiment of a computing environment 2100 for the PLS according to the present invention. The computing environment may be implemented at each of the base station and at the nodes. However, certain display components described below may only be incorporated into the base station or the non-fixed nodes, but may also be included in primary and secondary reference nodes. As shown, a Communication Infrastructure 2106 interfaces with a Display Interface 2102, a Main Memory 2108, a Secondary Memory 2110, a Communications Interface 2124, and a processor 2104. The Communication Infrastructure is adapted to communicate data between the various devices.

The display interface 2102 is further coupled to a Display 2130. The display interface is adapted to receive and process the node map, and to place the node map in the map view window of the GUI. The display interface 2102 outputs a display signal to the display 2130 to display the node map to the user.

The secondary memory 2110 is further comprises a hard disk drive 2112, a removable storage drive 2114, and an interface 2120. The secondary memory 2110 is further coupled to the removable storage units 2118 and 2122. The secondary memory 2110 is the storage device for the node or base station, and stores, for example, the range matrix information exchanged in the PLS, as well as other necessary software for implementing the other functions of the base station and nodes.

The Communications Interface 2124 is further coupled to the Communications Path 2126 through cable 2128.

Figure 22:
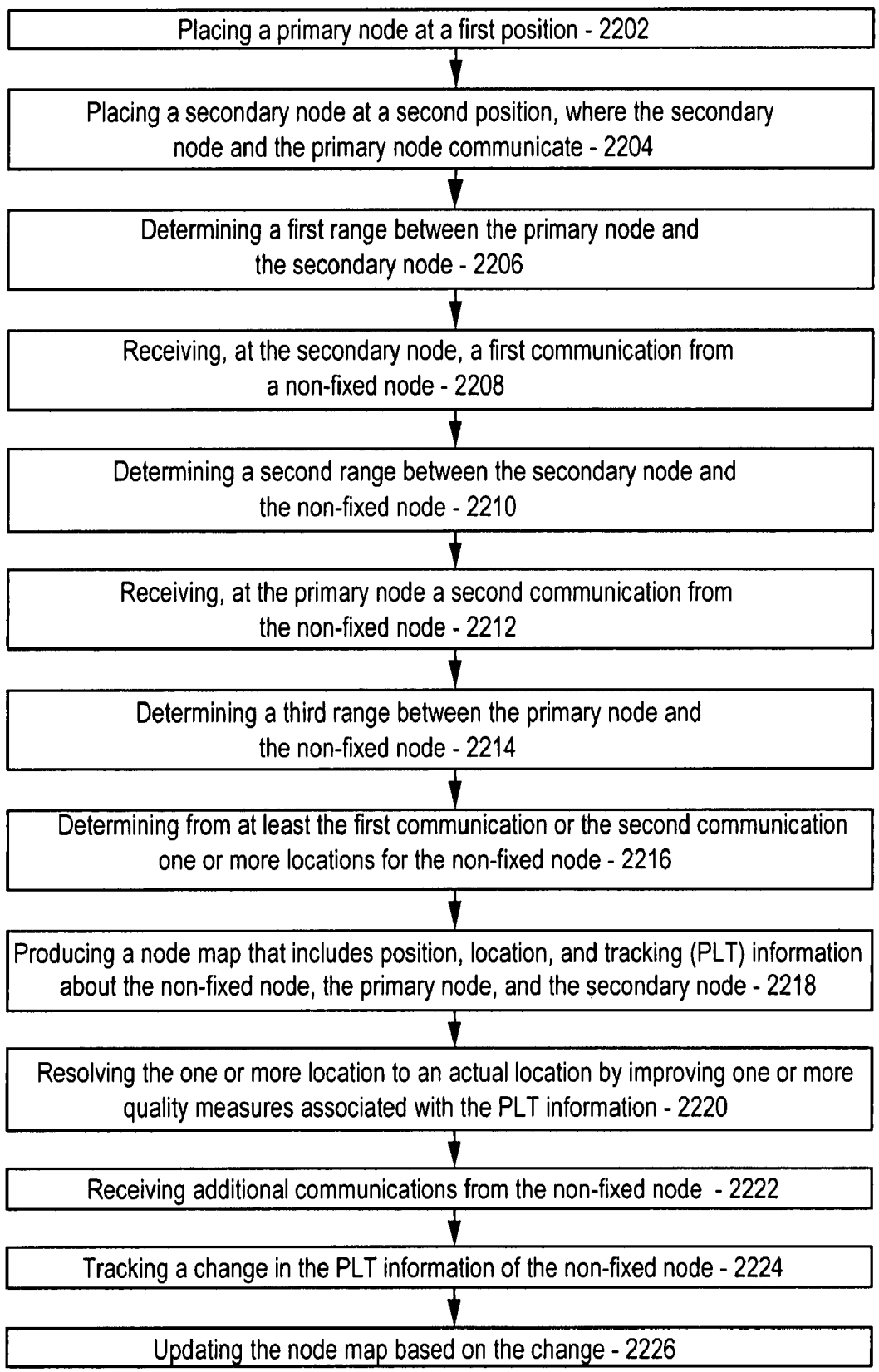
FIG. 22 illustrates an exemplary process performed by the PLS according to the present invention.

FIG. 22 illustrates an exemplary process performed by the PLS according to the present invention. In step 2202, a primary reference node is placed at a first position. In step 2204, a secondary reference node is placed at a second position, and the secondary reference node and the primary reference node communicate using, for example, UWB signals. In step 2206, a first range between the primary reference node and the secondary reference node is determined. In step 2208, the secondary reference node receives a first communication from a non-fixed node.

In step 2210, a second range between the secondary reference node and the non-fixed node is determined. In step 2212, the primary reference node receives a second communication from the non-fixed node. In step 2214, a third range between the primary reference node and the non-fixed node is determined. In step 2216, one or more locations for the non-fixed node is determined from at least the first communication or the second communication. In step 2218, a node map is formed that includes positioning information about the non-fixed node, the primary reference node, and the secondary reference node.

In step 2220, the one or more locations are resolved to an actual location by using one or more quality measures associated with the range matrix information. In step 2222, additional communications are received from the non-fixed node. In step 2224, changes in the range matrix information of the non-fixed node are tracked. In step 2226, the map is updated based on the changes in the range matrix information.

Figure 23:
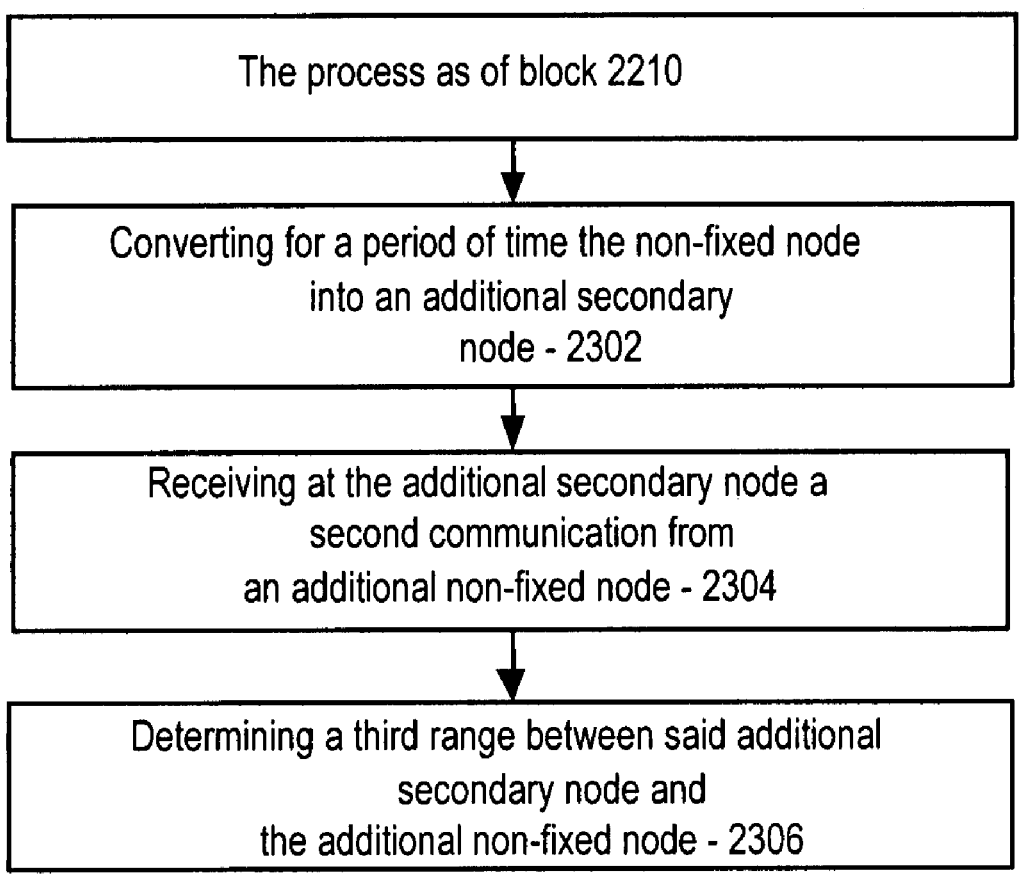
FIG. 23 illustrates an exemplary process of performing distance calculations by using a non-fixed node as a secondary reference node for a certain period of time according to the present invention.

FIG. 23 illustrates an exemplary process of performing distance calculations by using a non-fixed node as a secondary reference node for a certain period of time according to the present invention. In this embodiment, the exemplary process follows steps 2202-2210 in FIG. 22, and then after step 2210 proceeds to step 2302. In step 2302, the non-fixed node is converted into an additional secondary reference node for a period of time. In step 2304, the additional secondary reference node receives a second communication from an additional non-fixed node. In step 2306, a third range is determined between said additional secondary reference node and the additional non-fixed node.

Figure 24:
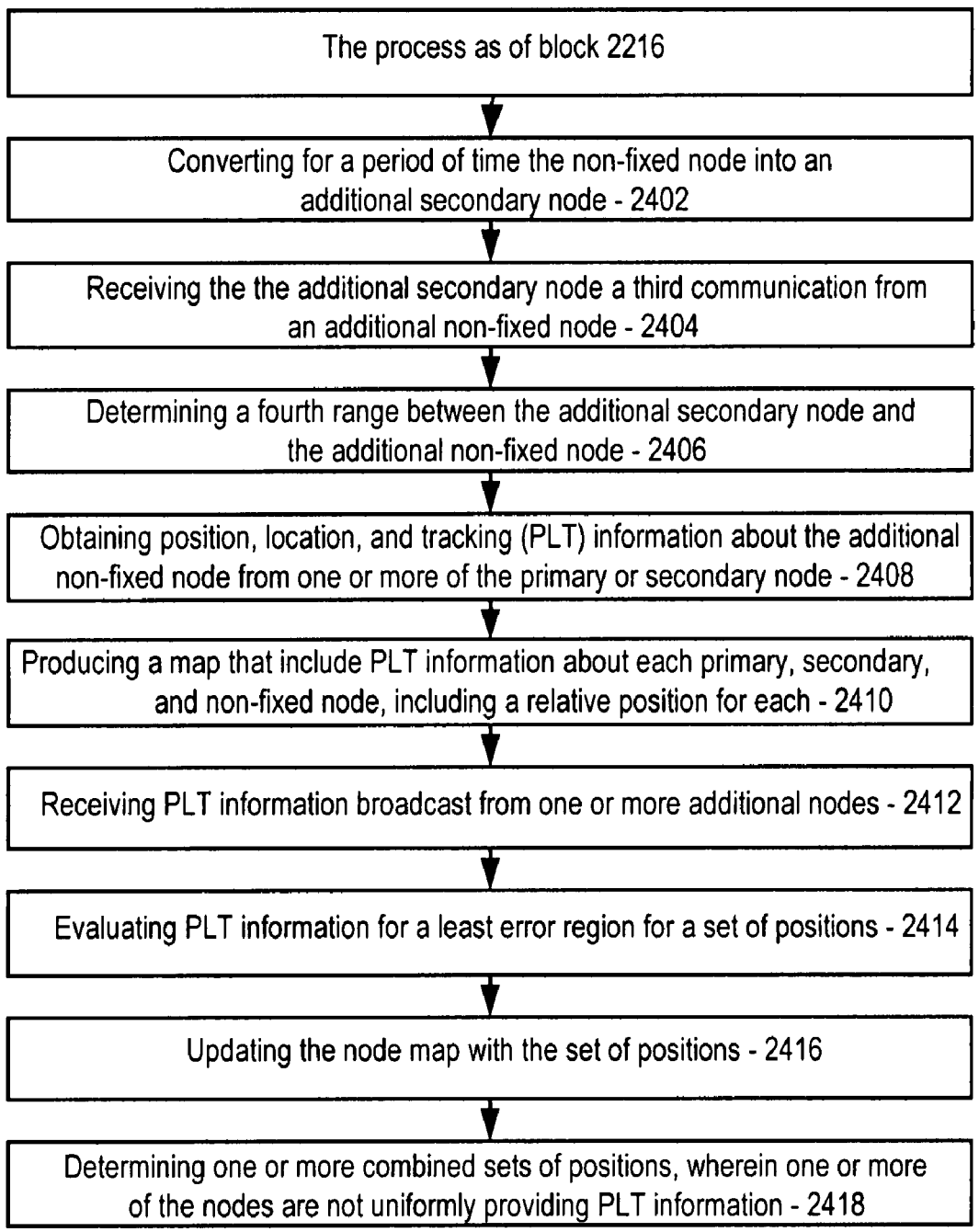
FIG. 24 illustrates another exemplary process of using a non-fixed node as a secondary reference node for a certain period of time according to the present invention.

FIG. 24 illustrates another exemplary process of using a non-fixed node as a secondary reference node for a certain period of time according to the present invention. The exemplary process follows steps 2202-2216 in FIG. 22, and then after step 2216 proceeds to step 2402. In step 2402, the non-fixed node is converted into an additional secondary reference node for a period of time. In step 2404, the additional secondary reference node receives a third communication from an additional non-fixed node. In step 2406, a fourth range is determined between said additional secondary reference node and the additional non-fixed node. In step 2408, range matrix information is obtained about the additional non-fixed node from one or more of the primary or secondary reference nodes.

In step 2410, a node map is produced that includes range matrix information about each primary, secondary, and non-fixed node and also includes a relative position of each. In step 2412, range matrix information is received from one of the primary, secondary, or non-fixed nodes. In step 2414, the range matrix information is evaluated for a set of positions of least error regions. In step 2416, the node map is updated with the set of positions. In step 2418, one or more combined sets of positions is determined, and the primary, secondary, and non-fixed nodes are not necessarily uniformly providing range matrix information.

It is noted that the present invention may be used in firefighter and warfare situations. The present invention is also particularly useful in these situations since the PLS is a man deployable UWB system that provides easily interpreted, real-time, highly accurate position location information to both a user carrying a non-fixed device, as well as incident command personnel who may be located at the base station, or at another remote location. The base station of the PLS may be used by as a command center where incident command personal track and direct the movement of troops or firefighters within a building. The base station may forward commands, such as go to position X, to identify the location of a non-fixed node user in need, or to order an evacuation of a building.

Also, the number of primary reference nodes, secondary reference nodes, base stations, and non-fixed nodes described above is for illustrative purposes. A greater or lesser number of nodes may be used without departing from the spirit and scope of the invention. As described previously, primary reference nodes may be placed about a coverage area as required to achieve an expected acceptable level of confidence in ranging measurements. Accordingly, non-fixed nodes and secondary reference nodes located at calibration points and acceptance level scoring criteria can be used to optimize primary reference node locations so as to provide a sufficient number of primary nodes to achieve acceptable ranging accuracy.

It is further noted that the present invention may be used in monostatic and/or bistatic radar array applications where single nodes or pairs of primary reference nodes, secondary reference nodes, and/or non-fixed nodes perform monostatic radar and/or bistatic radar functions as described in U.S. Pat. No. 5,363,108 (issued Nov. 8, 1994) to Fullerton, U.S. Pat. No. 6,177,903 (issued Jan. 23, 2001) to Fullerton et al., U.S. Pat. No. 6,218,979 (issued Apr. 18, 2001) to Richards, and U.S. Pat. No. 6,614,384 (issued Sep. 2, 2003) to Hall et al., all of which are incorporated herein by reference in their entirety.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method for determining a position of an ultra wideband (UWB) radio, comprising:
    determining using a processor a plurality of positions corresponding to a plurality of reference UWB radios;
    determining using a processor a plurality of confidence metrics corresponding to said plurality of positions;
    selecting using a processor a plurality of acceptable positions based upon said plurality of confidence metrics and an acceptance criteria; and
    determining using a processor said position of said UWB radio based upon said plurality of acceptable positions, said processor outputting to an interface said position of said UWB radio.

2. The method of claim 1, wherein said acceptance criteria provides a highest possible confidence level of said position of said UWB radio.

3. The method of claim 1, wherein at least one of said plurality of positions is determined based upon a UWB signal transmission.

4. The method of claim 3, wherein said UWB signal transmission is one of a one-way signal transmission or a round-trip signal transmission.

5. The method of claim 1, wherein at least one of said plurality of reference UWB radios is non-fixed.

6. The method of claim 1, wherein said UWB radio is capable of transmitting UWB signals and said UWB radio is not capable of receiving UWB signals.

7. The method of claim 1, wherein each of said plurality of confidence metrics comprises at least one of a range measurement quality metric, a standard deviation, a measurement age metric, an error region metric, a signal quality metric, an RF environment metric, or a ranging geometry metric.

8. The method of claim 7, wherein said ranging geometry metric comprises at least one of an angle acuteness metric or a geometric dilution of precision metric.

9. The method of claim 1, wherein the non-existence of a direct path between said UWB radio and at least one of said plurality of reference UWB radios is identified.

10. The method of claim 1, wherein a confidence level of said position indicates a requirement for one or more additional reference UWB radios to achieve an acceptable said confidence level.

11. The method of claim 1, wherein said UWB radio is a secondary reference UWB radio.

12. The method of claim 1, further comprising:
    filtering ranging noise prior to determining at least one position.

13. The method of claim 1, further comprising:
    positioning said plurality of reference UWB radios at locations intended to provide acceptable position determination accuracy over a coverage area.

14. The method of claim 1, further comprising:
    positioning said plurality of reference UWB radios such that said UWB radio is always within at least a desired distance from a closest reference UWB radio of said plurality of reference UWB radios.

15. The method of claim 1, wherein said acceptance criteria comprises at least one of a acceptability threshold or a decision tree.

16. The method of claim 1, wherein said acceptance criteria comprises at least one of a threshold, a decision tree, a work load, a number of times an error region has compounded, a line-of-sight characteristic, a speed, a direction, an elevation, a speed in change of speed, a speed in change of direction, or a speed in change of elevation.

17. The method of claim 1, wherein at least one of said plurality of reference UWB radios comprises a primary reference UWB radio.

18. The method of claim 1, wherein at least one of said plurality of reference UWB radios is positioned by one of a robot, a soldier, a firefighter, a police officer, or an emergency responder.

19. A system for determining a position of an ultra wideband (UWB) radio, comprising:
    a plurality of reference UWB radios corresponding to a plurality of positions; and
    at least one processor that determines a plurality of confidence metrics corresponding to said plurality of positions, selects a plurality of acceptable positions from said plurality of positions based upon said plurality of confidence metrics and an acceptance criteria, determines said position of said UWB radio based upon said plurality of acceptable positions, and outputs said position of said UWB radio to an interface.

20. A method for determining a position of an ultra wideband (UWB) radio, comprising:
    determining using a processor a plurality of position confidence metrics corresponding to a plurality of reference UWB radio positions;
    selecting using a processor a plurality of acceptable reference UWB radio positions from said plurality of UWB radio positions based upon said plurality of position confidence metrics and an acceptance criteria; and
determining using a processor said position of said UWB radio based upon said plurality of acceptable reference radio positions, said processor outputting to an interface said position of said UWB radio.

* * * * *